United States Patent [19]
Kuhn et al.

[11] Patent Number: 5,339,282
[45] Date of Patent: Aug. 16, 1994

[54] RESOLUTION ENHANCEMENT FOR ULTRASONIC REFLECTION MODE IMAGING

[75] Inventors: Paul K. Kuhn, Midvale; Steven A. Johnson, Salt Lake City, both of Utah

[73] Assignee: University of Utah Research Foundation, Salt Lake City, Utah

[21] Appl. No.: 956,036

[22] Filed: Oct. 2, 1992

[51] Int. Cl.⁵ ............................................. G03B 42/06
[52] U.S. Cl. ........................................ 367/7; 367/902
[58] Field of Search .......................... 367/7, 902, 11; 364/413.25; 358/112; 128/660.06; 73/602

[56] References Cited

U.S. PATENT DOCUMENTS

| | | | |
|---|---|---|---|
| 4,105,018 | 8/1978 | Greenleaf et al. | 73/602 |
| 4,855,911 | 8/1989 | Lele et al. | 73/602 |

*Primary Examiner*—Daniel T. Pihulic
*Attorney, Agent, or Firm*—Trask, Britt & Rossa

[57] ABSTRACT

An annular array scanner utilizes a synthetic focusing approach to improve imaging results. Image sharpening methods include corrections for the speed of sound of the image, phased array misregistration and separate view misalignment as well as inverse filtering for the scanning system point spread function.

29 Claims, 22 Drawing Sheets

RESOLUTION ENHANCEMENT FOR ULTRASONIC REFLECTION MODE IMAGING

This invention was made with Government support under Contract No. N00014-92-J-6006 awarded by the Department of the Navy. The government has certain rights in the invention.

BACKGROUND OF THE INVENTION

1. Field

This invention relates to reflection mode ultrasonic imaging systems. It is particularly directed to a synthetic focusing approach useful for enhancing the images obtainable from an annular array scanner.

2. State of the Art

The B-scan is a pulse echo technique where a pulse is sent into the object to be imaged and the echoes from the object are received by the same transducer used for transmitting. The positions of the echoes in time along with transducer positioning information allow the reconstruction of tissue interface or reflector positions. The imaging target is usually assumed to have a constant speed of sound throughout the object. It is also usually assumed that sound propagates in a straight line. Spatial position s(t), may then be determined as a function of time:

$$s(t) = \frac{(c_0 \cdot t)}{2}$$

where $c_0$ is the average speed of sound of the object. Since $c_0$ is an approximation, there will be errors in position and the reconstruction associated with this approximation. It is known that biological soft tissue has about a $+/-5\%$ variation. The approximation that the velocity of sound is the same as water throughout an imaging target consisting of biological tissue will cause some improper mapping of time signal to spatial position.

Arrays of transducers have allowed the usage of various phased array or beam-steering techniques. This technique involves delaying signals from the different transducer elements in the array. The signals are delayed in a manner to achieve a dynamic focusing effect. These delayed signals are summed in a fashion to pick out only those signals representing the same phase front. This technique makes use of approximate transducer position in order to reconstruct the peak reflection locations reflected from the object to be imaged. Variations in the speed of the sound in an object to be imaged will provide additional variations in the required delays. Failure to account for these approximations also cause some improper mapping of time signal to spatial position.

The single view synthetic focusing algorithm also can make use of the phased array technique. The first synthetic focusing reconstructions were also based on the straight line path approximation as are most of the beam-steering methods developed to date. Current known imaging methods all make use of approximations of constant speed of sound, straight line path of sound propagation, and in transducer location.

A more advanced implementation of the synthetic focusing algorithm makes use of many views of the object to be imaged and combines them into one image with improved resolution. This implementation makes use of approximations in the view angle rotation and the relative center of the rotation of the object to be imaged. Inaccurate approximations in the view angle rotation and relative center of rotation increase the reconstruction blurring and reduces the resolution of the image.

In general imaging systems, a distortion occurs because of the inherent processes used in reconstructing the image. The distorting function is commonly known in the imaging field as the point spread function. Designers of various imaging systems can make theoretical approximations of this point spread function in order to minimize its effect. Calculations for more complicated imaging systems require more crude approximations because the complete characterization of the causes of these distortions may not be possible. This leads to poorer resolution in the reconstructions from imaging systems that attempt the removal of the point spread functions by theoretical approximations.

Among the publications regarded as informative concerning the state of the art as it pertains to the present invention are: S. J. Norton and M. Linzer, "Correction for ray refraction in velocity and attenuation tomography: a perturbation approach," Ultrasonic Imaging 4, pp. 201-233, New York, N.Y.: Plenum Press, 1982; C. H. Knapp and G. C. Carter, "The generalized correlation method for estimation of time delay," IEEE Transactions on Acoustics, Speech, and Signal Processing, vol. ASSP-24, no. 4, pp. 320-327, August 1976; D. Hiller and H. Ermert, "System analysis of ultrasound reflection mode computerized tomography," IEEE Transactions on Sonics and Ultrasonics, vol. SU-31, no. 4, pp. 240-250, July 1984; F. J. Millero, "Speed of sound in seawater as a function of temperature and salinity at 1 atm," J. Acoust. Soc. Am., vol. 57, no. 2, pp. 312-319, February 1975; and R. C. Weast ed., CRC Handbook of Chemistry and Physics, Boca Raton, Fla.: CRC Press, 1981.

SUMMARY OF THE INVENTION

One of the objects of the invention is to provide an improved means of creating a high resolution acoustic or ultrasonic imaging system by means of a phase array transducer system, which can accurately and reliably provide a reconstructed reflectivity image of physical objects by non-invasive methods that can minimizes the image distortions due to variations in the speed of sound of the object.

Another object of the invention is to provide an improved means of creating a high resolution acoustic or ultrasonic imaging system by means of a phase array transducer system, which can accurately and reliably provide a reconstructed reflectivity image of physical objects by non-invasive methods that can minimize the image distortions caused by imperfections in the phase array transducer construction.

Another object of the invention is to provide an improved means of creating a high resolution acoustic or ultrasonic imaging system by means of a phase array transducer system or non-phase array transducer system, which can accurately and reliably provide a reconstructed reflectivity image of physical objects by non-invasive methods that minimizes the image distortions caused by the overall point spread function of the imaging system even though the said point spread function may not be estimated by theoretical means.

Another object of the invention is to provide an improved means of creating a high resolution acoustic or ultrasonic imaging system by means of a phase array transducer system or non-phase array transducer system that uses multiple view in the image processing procedure, which can accurately and reliably provide a reconstructed reflectivity image of physical objects by non-invasive methods that can minimizes the image distortions caused by the poor estimation of the relative center of rotation of the object with respect to the original view.

Another object of the invention is to provide an improved means of creating a high resolution acoustic or ultrasonic imaging system by means of a phase array transducer system or non-phase array transducer system that uses multiple view in the image processing procedure, which can accurately and reliably provide a reconstructed reflectivity image of physical objects by non-invasive methods that can minimizes the image distortions caused by the poor estimation of the relative angle of rotation of the object with respect to the original view.

In accordance with one aspect of the invention, generally stated an acoustic or ultrasonic scanner consists of a vessel containing a medium that permits the propagation of acoustic or ultrasonic wave to an imaging target, a controlled positioning system to position the transducers and/or imaging target to a precise position, single stand-alone or arrays of transducers on a surfaces of known configuration, means for creating electrical and/or mechanical energy within the transducers, instrumentation for data collection, a signal processing means to reconstruct images from the data collected from reflected or transmitted signals, a means to store the data and reconstructed images, and a means to display the reconstructed images. The signal processing means takes the form of a specific algorithm that can be implemented by adaptive circuitry that can minimize the distortions inherent in the image reconstruction process.

In accordance with one aspect of the invention, the signal processing means has a processing procedure to incorporate measured or estimated values on the speed of sound of the imaging target into the reconstruction process.

In accordance with another aspect of the invention, the signal processing means has a processing procedure to adaptively estimate the physical positioning of transducer elements with respect to another transducer element in a transducer array from a calibration imaging target.

In accordance with another aspect of the invention, the signal processing means has a processing procedure to estimate the point spread function of the imaging system from a calibration imaging target.

In accordance with another aspect of the invention, the signal processing means has a processing procedure to adaptively estimate the relative center of rotation of a reconstructed image from one view with respect to another view of the same imaging target.

In accordance with another aspect of the invention, the signal processing means has a processing procedure to adaptively estimate the relative angle of rotation of a reconstructed image from one view with respect to another view of the same imaging target.

BRIEF DESCRIPTION OF THE DRAWINGS

In the drawings, which illustrate what is presently regarded as the best mode for carrying out the invention.

DETAILED DESCRIPTION OF THE PREFERRED EMBODIMENT

Figure 1:
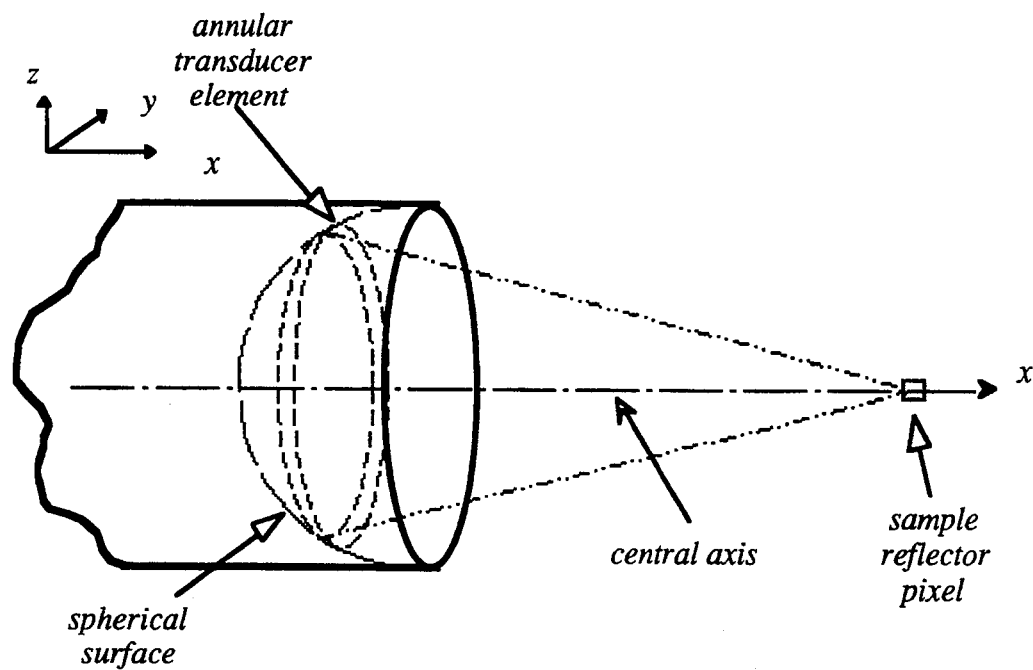
FIG. 1 is a fragmentary schematic illustration of a general system of annular array on a spherical surface about a central axis.

Consider a source at a position in space $x_s$, capable of sending a pulse of acoustic energy toward an imaging target. Within the imaging target at a point $x_j$, let there be a point reflector coefficient $\tilde{r}_j$. Also let there be a detector at position $x_m$, capable of receiving acoustic energy. Typically a detector will register voltages in response to the reception of acoustic energy. Qualitatively the voltage will be a function of (1) the position of the source, (2) the position of the detector, (3) the position of the reflector, (4) the time that the pulse was generated at the source, (5) the time the pulse travels from source to reflector to detector, (6) the attenuation experienced by the pulse as it propagates along the path of propagation, and (7) the ability of the reflector to scatter acoustic energy in the direction of the detector from the direction of the source.

The time delay is a function of the path traveled and the velocity of sound. This may be expressed as:

$$\tau_{sjm} = \int_{x_s}^{x_j} \frac{ds}{c(s)} + \int_{x_j}^{x_m} \frac{ds}{c(s)} \qquad \text{(Equation 1)}$$

where c(s) is the speed of sound along the propagation path s, and ds is the incremental distance along the path.

The attenuation encountered by the propagation pulse along the path is a function of the acoustic attenuation of the imaging target and the geometric amplitude spreading loss of the wave itself. This may be written as:

$$l_{sjm} = Q(s_{sj})Q(s_{jm})\exp\left\{-\left[\int_{x_s}^{x_j}\mu(s)ds + \int_{x_j}^{x_m}\mu(s)ds\right]\right\} \qquad \text{(Equation 2)}$$

where $\mu(s)$ is the acoustic attenuation encountered along the path, $s_{sj}$ is the straight ray path distance from $x_s$ to $x_j$, $s_{jm}$ is the straight ray path distance from $x_j$ to $x_m$, and $\tilde{Q}(r)$ is the geometric amplitude spreading term ($\tilde{Q}(r)=1/r$ for three-dimensional models and $\tilde{Q}(r)=1/\sqrt{r}$ for two-dimensional models).

The derivation of the reflected signal at detector location $x_m$ from a source location $x_j$ can be obtained using the arguments that follow. The modeling of the transducer system transfer function comes from the physical components used in sending and receiving the ultrasonic pulses. The electrical impulse of amplitude a used to excite the transducer at time $t_o$ can be modeled as $a\cdot\delta(t-t_0)$. This impulse is convolved with the impulse response function of the electrical apparatus $h_e(t)$. This new waveform is then convolved with the impulse response function of the source transducer element $h_s(t)$. This is in turn convolved with the impulse response function of the reflector $\tilde{r}(t-\tau_j)$ where $\tau_j$ is the round trip time delay from source to detector. The reflected signal at the detector is convolved with the impulse response function of the detector transducer $h_m(t)$. The attenuation factor $l_{sjm}$ from equation (2) is a multiplier on the received waveform, which is a function of space and may be mapped into a function of time offset from the time of excitation. Then, the voltage received from each reflector point would be:

$$v_{sjm}(t) = [a\cdot\delta(t-t_0)*h_e(t)*h_s(t)*h_m(t)*\tilde{r}(t-\tau_{sjm})\cdot l_{sjm}]. \qquad \text{(Equation 3)}$$

The voltage received from all reflector points in a superposition of the waveforms from all the reflectors, which is modeled as a summation over the reflection points. Then for a total of J reflector points in an imaging target, the received voltage at a detector m with respect to an incident source s can be written as:

$$v_{sm}(t) = \sum_{j=1}^{J} v_{sjm}(t) = \qquad \text{(Equation 4)}$$

$$\sum_{j=1}^{J} [a\cdot\delta(t-t_0)*h_e(t)*h_s(t)*h_m(t)*\tilde{r}(t-\tau_{sjm})\cdot l_{sjm}].$$

The electrical waveform providing excitation at the source can be represented as:

$$a\cdot\delta(t-t_0)*h_e(t) = a\cdot h_e(t-t_0) \equiv w_e(t-t_0). \qquad \text{(Equation 5)}$$

The transducer impulse response function from source s and detector m can be combined, then:

$$h_s(t)*h_m(t) \equiv h_{Tsm}(t). \qquad \text{(Equation 6)}$$

Using equation (5) and (6), equation (4) can be reduced to:

$$v_{sm}(t) = \sum_{j=1}^{J} [w_e(t-t_0)*h_{Tsm}(t)*\tilde{r}(t-\tau_{sjm})\cdot l_{sjm}]. \qquad \text{(Equation 7)}$$

The time $t_O$ is an arbitrary reference point relative to each source/detector pair, let this reference time be $t_O=0$. Then equation (7) is simplified to:

$$v_{sm}(t) = \sum_{j=1}^{J} [w_e(t)*h_{Tsm}(t)*\tilde{r}(t-\tau_{sjm})\cdot l_{sjm}]. \qquad \text{(Equation 8)}$$

The reflection from each point reflector is assumed to be a scaled impulse of a magnitude that is a function of the reflector position. This can be expressed as:

$$\tilde{r}(t-\tau_{sjm}) = \tilde{r}(x_j)\cdot\delta(t-\tau_{sjm}). \qquad \text{(Equation 9)}$$

Using equation (9), equation (8) can be reduced and simplified to:

$$v_{sm}(t) = \sum_{j=1}^{J} [w_e(t-\tau_{sjm})*h_{Tsm}(t)\cdot l_{sjm}\cdot\tilde{r}(x_j)] \qquad \text{(Equation 10)}$$

where the impulse was used to operate on the excitation waveform.

To ignore the effects of the transducer impulse response function (as a first approximation), let $h_{Tsm}(t) = \delta(t)$. Using this approximation, equation (10) becomes:

$$v_{sm}(t) = \sum_{j=1}^{J} [w_e(t - \tau_{sjm}) \cdot l_{sjm} \cdot \vec{r}(x_j)].\quad\text{(Equation 11)}$$

One interpretation of equation (11) is that $v_{sm}(t)$ contains a representation of the reflection properties of the media along the propagation path of the pulse. These reflection properties seen at the detector depend on the geometry of the source with respect to the detector as well as the point detectors themselves. Appropriate placement of sources and detectors should insure that the ensemble of propagation paths completely cover the target space. This, of course, would require an infinite number of propagation paths to cover the infinite number of reflection points. As with X-ray CAT scans, practical considerations require limiting the propagation paths to a finite number. This is done by dividing the imaging target or sample space into a finite number of volume elements (voxels) for three-dimensional sample spaces or picture elements (pixels) for two-dimensional sample spaces such as cross-sections.

Sampling the voltage signal discretely at $t_i$, then:

$$v_{smi} = v_{sm}(t_i) = \sum_{j=1}^{J} [w_e(t_i - \tau_{sjm}) \cdot l_{sjm} \cdot \vec{r}(x_j)].\quad\text{(Equation 12)}$$

This may be written as an over-determined system:

$$\vec{v} = \overline{M}\vec{r} \quad\text{(Equation 13)}$$

where $$\overline{M} = w_e(t_i - \tau_{sjm}) \cdot l_{sjm} \quad\text{(Equation 14)}$$

which has the least squares solution:
$$\vec{r} = (\overline{M}^\dagger \overline{M})^{-1} \overline{M}^\dagger \vec{v}.\quad\text{(Equation 15)}$$

This is the synthetic focusing algorithm in its general form. For various reasons to be discussed, $(\overline{M}^\dagger \overline{M})$ is difficult to invert. In order to avoid this inversion, $(\overline{M}^\dagger \overline{M})^{-1} \overline{M}^\dagger$ can be approximated by a backprojection operator B. Using this operator, equation (15) can be written as:

$$\vec{r} \approx B\{\vec{v}\}.\quad\text{(Equation 16)}$$

The annular array scanner of the preferred embodiment of the invention is based on an annular array designed to send pulses toward imaging targets and collect the signals reflected from the target. The array has the ability to focus pulses using phased array techniques along the central axis of the annular array as shown by FIG. 1. This assumes a straight line propagation path within the target. Application of this focusing along the axis limits the possible reflectors to a narrow beam along this central axis. Letting this central axis be represented by the x axis, the reflector points in the y and z directions are limited to the beam width at the focused point along the central axis. The first approximation to be made is that the beam width at each phased array focused point is narrow enough that reflections will only originate from those reflectors along the central axis. The mechanical positioning motors limit the source and detector locations to permit the collection of reflected data in a single plane of the target perpendicular to the z axis. Yet data may be taken at many angles. A linear motor can move the transducer array along the y axis to collect reflection signals at different y coordinates filling out the set of reflection points within the target cross-section.

To summarize the concept of phase array focusing or beam steering for an annular array, consider the situation where there are transducer ring elements on a spherical surface as in FIG. 1. The time of propagation of a pulse can be computed from a point source to a given element of the annular array. Equation (1) is the general expression for the time of propagation or time delay from source to element to receiver. Excitation of a transducer element with a voltage pulse initiates the propagation of an acoustic pulse toward the imaging target. The acoustic waves that make up the acoustic pulse encounter and reflect from interfaces.

Modeling each point along the central axis as a point reflector, gives a reference with which to reconstruct spherical wave fronts as if each point reflector is a point source. This reference provides a coordinate along the x axis for the point reflector $x'_j$ where the prime indicates a rotated coordinate system for the current view at angle $\phi_l$. Then, if c(s) is known along with the propagation path and source and detector locations, the time of propagation for a wave front may be determined by calculating the time of travel along the path propagation. Sampling of the induced voltages on the transducer elements at the proscribed times for each element provides information on the wave reflected from that point reflector. Adjustments in the various time delays permit the collection of reflected pulses from different point sources. This may be accomplished in practice by continuously sampling the transducer voltages at regular intervals. Then the time delays may be calculated for each point reflector with respect to each source and detector at a later time. Summation of the reflected voltage contributions of the wave fronts at the various elements from the point reflector is similar to having a transducer focused at the point reflector.

Unfortunately, propagation paths ds and the velocity of sound c(s) along that path is not usually known to a high degree of accuracy. The usual approximations with respect to the velocity of sound are that c(s) is taken to be constant and that the propagation paths can be represented as straight rays. This was justified by the 5% speed of sound variations in soft tissue. This simplifies the computation of equation (1). Using these approximations, propagation paths may be determined by the geometry of the array.

Figure 2:
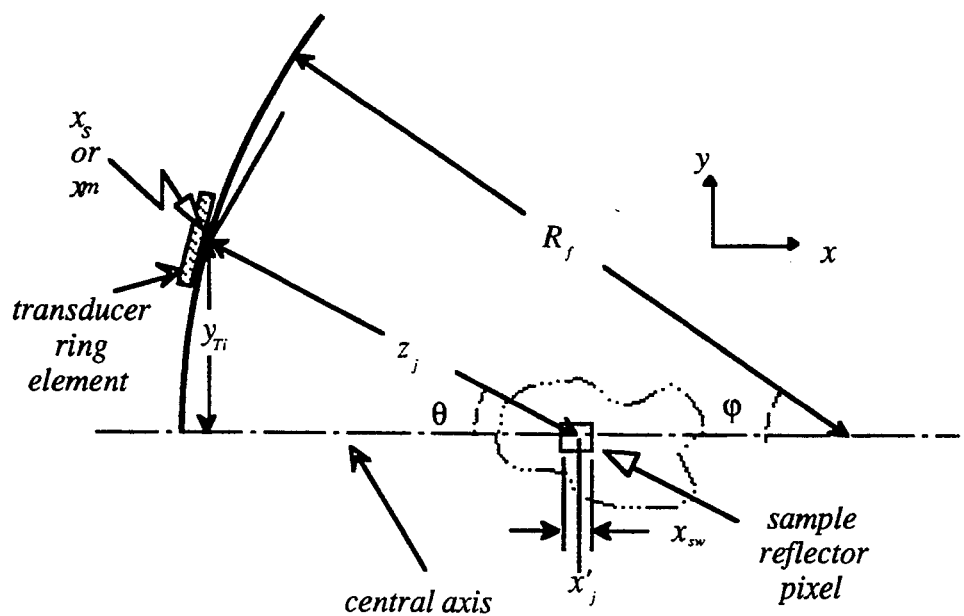
FIG. 2 is an analytical depiction of the general geometry for time delay calculations typical of this invention.

Assume that an acoustic media with a precisely known $c(s) = c_O$, such as water at a known temperature, surrounds the imaging target. Also assume that the velocity of sound inside the target is the same as that of the surrounding acoustic media (this assumption will be removed later to improve the accuracy of the model). Referring to FIG. 2, the time delay from sample reflector point at pixel $x'_j$ to the transducer element at $y_{Ti}$ can be determined by $\tau_{sj} = z_j/c_O$ where $z_j$ is the straight ray from the transducer element to the sample pixel. The geometry of the array allows a relationship of $z_j$ to $x'_j$ if the positions of the transducer elements $y_{Ti}$ and the radius of the curved surface $R_f$ on which the transducer rests are known. Round trip time is calculated by adding the time delay from the source to reflector and the time delay from the reflector to detector, that is $\tau_{sjm} = \tau_{sj} + \tau_{jm}$. The total time delay is then applied to the sampled voltage data for each source/detector pair to obtain an estimate of the received voltage signal as a function of space:

$$\hat{v}_{sm}(x'_j) = v_{sm}(\tau_{sjm}). \quad \text{(Equation 17)}$$

Calculated time delays may or may not correspond an actual sampled time, but the voltage values for calculated time delays between samples may be determined by interpolation. As mentioned above, the estimated voltage signal as a function of spatial coordinates for each transducer element can be interpreted as different components of the expanding spherical wave from the point reflectors. A composite waveform may be produced by summing the voltages at each detector due to a given reflector point. The composite waveform represents the reflected signal as if it were a spherically expanding wave originating from that given point reflector. Performing this operation for each spatial sample point along the central axis of the array gives reflection information as if each spatial sample point is focused upon by the transducer. In this manner a one-dimensional representation of the reflection properties of the image target along the central axis of the transducer may be reconstructed.

To apply this procedure given the geometry of the scanner, let the angle from which the target is being viewed by the array be denoted by $\phi_l$ where l is the index of the angle. Since the source/detector pairs are limited, let the transducer source/detector pair be indexed by q in place of sm. Also let the central position of the annular array along the y axis be denoted a $y'_k$ where the prime indicates the rotated coordinate system due to the view of $\phi_l$. That is $\hat{v}_{sm}(x'_j) \rightarrow \hat{v}_{q,\phi_l}(x'_j, y'_k)$ where the voltage due to a source/detector pair reflected from a point in the cross-section as function of position at the view $\phi_l$ denoted as $\hat{v}_{q,\phi_l}(x'_j, y'_k)$. The summation over the source/detector pair signals to produce the composite focused signal may then be represented as:

$$\hat{v}_{\phi_l}(x'_j, y'_k) = \sum_{q=1}^{Q} \hat{v}_{q,\phi_l}(x'_j, y'_k) \quad \text{(Equation 18)}$$

where Q is the number of transducer pairs.

If the magnitude of the reflected signal is of primary interest, calculation and use of the envelope of the one-dimensional reflected image can provide a suitable means of presenting this reflected one-dimensional image. This also prevents cancellation of the reflection properties during the view summation step when summing the reconstructions from opposing angles. Positioning the array at various locations along the y axis of the view, reconstructing these one-dimensional images for each position $y'_k$, and positioning all the one-dimensional images at the proper positions in a two-dimensional grid can provide a two-dimensional representation of the reflection properties of the target. This can be expressed as:

$$\mathbf{p}_{\phi_l}(x'_j, y'_k) = \text{env}_{x'}\{\hat{v}_{\phi_l}(x'_j, y'_k)\} \quad \text{(Equation 19)}$$

where $\text{env}_{x'}\{\cdot\}$ is the envelope operator of the one-dimensional spatial signal in the x' direction and $\mathbf{p}_{\phi_l}(x'_j, y'_k)$ is used denote this projection function of $\phi_l$, $x'_j$, and $y'_k$.

This procedure can be performed at many different views. Because data for each view is taken at a different angle, there will be an angular misregistration between views. This registration may be reconciled by a rotational transformation:

$$\begin{bmatrix} x \\ y \end{bmatrix} = \begin{bmatrix} \cos\hat{\phi}_l & -\sin\hat{\phi}_l \\ \sin\hat{\phi}_l & \cos\hat{\phi}_l \end{bmatrix} \begin{bmatrix} (x' - \hat{x}'_0) \\ (y' - \hat{y}'_0) \end{bmatrix} + \begin{bmatrix} \hat{x}_0 \\ \hat{y}_0 \end{bmatrix} \quad \text{(Equation 20)}$$

where $\hat{x}_0$ and $\hat{y}_0$ are the estimated coordinates for the center of rotation of the transformed view, $\hat{x}'_0$ and $\hat{y}'_0$ are the estimated coordinates for the center of rotation of the non-transformed view, and $\hat{\phi}_l$ is the estimate of the angle of rotation. As an approximation with respect to the center of rotation, assume these estimates have no error. Again, using the interpretation that each view is a component of a two-dimensional reflection image, the views may be summed at each pixel to form a compound image of the reflection properties of the imaged target. This reconstruction will be an estimate of the reflection properties of the imaged target's cross-section. Let the estimated reflection property be denoted by $\hat{r}(x_j, y_k)$ which can be expressed mathematically as:

$$\hat{r}(x_j, y_k) = K^{} \sum_{l=1}^{L} \mathbf{p}_{\phi_l}(x_j, y_k) = K^{} \sum_{l=1}^{L} T^R\{\mathbf{p}_{\phi_l}(x'_j, y'_k)\} \quad \text{(Equation 21)}$$

where $T^R\{\cdot\}$ indicates the rotational transformation operator on each x' and y' coordinate and L is the number of views used in the data collection. Here K is a deblurring kernel and ** indicates a two-dimensional convolution. Writing this procedure in one equation yields:

$$\hat{r}(x_j, y_k) = K^{**} \sum_{l=1}^{L} T^R\left\{ \text{env}_{x'}\left( \sum_{q=1}^{Q} \hat{v}_{q,\phi_l}(x'_j, y'_k) \right) \right\}. \quad \text{(Equation 22)}$$

Comparing equation (22) to equation (16) shows that:

$$B\{\hat{v}_{q,\phi_l}(x'_j, y'_k)\} \approx K^{**} \sum_{l=1}^{L} T^R\left\{ \text{env}_{x'}\left( \sum_{q=1}^{Q} \hat{v}_{q,\phi_l}(x'_j, y'_k) \right) \right\}. \quad \text{(Equation 23)}$$

In a general sense this is a backprojection procedure. In time of flight images using the backprojection method for image reconstruction, $p\phi(r)$, a function of two dimensions $\phi$ and r, is summed to produce a reconstruction of two dimensions. In this synthetic focusing algorithm, $\mathbf{P}_{\phi_l}(x_j, y_k)$, a function of three dimension $\phi$, x, and y, is summed over $\phi$ in equation (21) to produce a reconstruction of two dimensions.

The usual approximations for soft biological tissue are that (1) it has a constant velocity of sound and (2) sound propagates in straight paths through the tissue. This ignores the known 5% variation in the speed of sound. This leads to image blurring due to poor estimates in the pulse propagation time and refraction. Approximations in the speed of sound can cause distortions in the single view reconstructed image and misregistration when applied to images composed of many compound views. This distortion and misregistration will be a significant cause of blurring of the details of an image.

These problems can be reduced with the use of a prior knowledge of the object's spatial acoustic velocity distribution. Using this information appropriately during the mapping of the time domain voltage signal to the spatial domain voltage signal will reduce the error and sharpen the reflection image.

Another approximation which is usually not recognized in imaging system is that (3) the precise position of the transducer element positioning within the array was known. Element position errors on the order of a eighth of a wavelength will cause distortions in the focused composite voltage signal due to signal misregistration in the phase array focusing procedure. The preferred scanner annular array transducer has a center frequency of 2.25 MHz. In water, a quarter of a wavelength at this frequency would be only 0.167 mm. With significant time and effort, precise mechanical measurements could be made be determine the element position.

A better method would be to use the data itself to align the received signals using the inherent resolution of the finely sampled electronic scanner. Signals originating from the same point reflector in the same direction will have similar characteristics. This realization suggests that cross-correlation of the signals from these different source/detector pairs can provide a basis for estimating the amount of position error between the pairs. This cross-correlation technique also can be sued as a basis for insuring proper signal registration during the summation of the array element signals.

The scanner used in the preferred embodiment of the invention rotates the imaging target in incremental angular steps with the use of a rotational stepping motor. The synthetic focusing algorithm requires specific knowledge of this angle in order to provide proper alignment between views during the summation step to create the compound image which was approximation (4). Also, an accurate estimate of the center of rotation coordinates is needed in order to compute the proper rotational transformation on the data from each single view before the compound image is calculated. Poor estimates in the rotational angle between views and the actual center of rotation coordinates will lead to image blurring.

An imaged target will have similarities between views since they are image of the same objects viewed from different reference points. This again suggests that the cross-correlation function may provide information on the misalignment of the views. These cross-correlation techniques applied in an iterative manner are adaptive focusing techniques.

The narrow beam approximation (5) of the transducer beam width is also a source of blurring. This approximation assumes that reflections from points not located on the central axis of the annular transducer will not be included in the reflection voltage signal during the data acquisition process. Reflections from point reflections in adjacent positions to the central axis do contribute to the reflection signals because the beam is wider than a pixel width. This is the major contribution to the point spread function in the lateral or y direction. Transducer ringing is the primary element of the point spread function of the longitudinal or x direction. Although the view summation technique of the synthetic focusing algorithm reduces later point spread function considerably, more can be done.

Removal of the point spread function from images by inverse filtering is an obvious approach to image deblurring. A problem inherent with this approach is the estimation of point spread function of the imaging system. Estimation of the point spread function may be performed using a calibration imaging target with a known reflection image. Choice of an object with known point reflectors permits a comparison between the reconstructed image and the known image. Linear system theory then allows the characterization of the point spread function of the scanner reconstruction algorithm. This characterized point spread function may then be used to create a filter to remove the point spread function from the reconstructed images.

To create a high resolution image of an object using the synthetic focusing algorithm, a reasonable estimate of the object's refractive index or speed of sound is required. This map can be generated by time of flight tomography or by inverse scattering techniques. The time of flight technique typically assumes that the paths traveled from source to receiver are straight lines. In general, this is not the case due to Fermat's principle which states that "the optical length of an actual ray between two points" source $x_s$ and receiver $x_m$ "is shorter than the optical length of any other curve that joins these points." The optical length is given by:

$$\text{optical length} = \int_{x_s}^{x_m} n(s) \cdot ds_A = c_0 \cdot \int_{x_s}^{x_m} ds_A/c(s), \quad ds_A \in AP, \quad \text{(Equation 24)}$$

where $n(s)$ is the refractive index along the path, $c_0$ is the standard velocity of sound (e.g. velocity of sound in water), and $c(S)$ is the speed of sound the true or actual path, AP. Fermat's principle is also known as the least time principle.

Norton and Linzer have developed an approach based on perturbation theory to correct for the effects of refraction in transmission tomography. This theory is extended in accordance with invention to correct for refraction in the reflection mode synthetic focusing algorithm.

In reflection mode tomography, the path to the source from the detector involves the inclusion of a reflector position $x_j$. Again, the actual path is approximated by a straight ray path between $x_s$ and $x_j$ and also $x_j$ and $x_m$. The variations from a straight ray path are due to refraction. The variations from the straight ray path will be small if the variations in the speed of sound of the image under study is small. This assumption will be made here. An image of the speed of sound will be used to predict the variations from this straight line path.

In reflection mode tomography, the time of propagation is a quantity that must be calculated to determine the position of the reflection sources. This may be accomplished by modification of equation (24). Let the time of propagation from $x_s$ to $x_j$ and from $x_j$ to $x_m$ be denoted as $\tau_{sjm}$. This is calculated by integrating over a function of the speed of sound or, equivalently, by integrating over a function of the index of refraction. This can be expressed as:

$$\tau_{sjm} = \left(\frac{1}{c_0}\right)\left[\int_{x_s}^{x_j} n(s) \cdot ds_A + \int_{x_j}^{x_m} n(s) \cdot ds_A\right], \quad ds_A \in AP, \quad \text{(Equation 25)}$$

where $n(s) = c_0/c(s)$ and $c_0$ is the average speed of sound of the medium.

Let an approximation to the curved path be the straight line paths $x_s$ to $x_j$ and $x_j$ to $x_d$. For the development of the perturbation approach, let a straight line path be along the x axis, starting at x=0, ending at x=1. The curved path will vary in the y and z directions along the x axis, but the variations will be small. The curved path will begin and end at the source and detector respectively.

The time delay $\tau_A$ along the true or actual curved path, will differ from the time delay $\tau_S$ along the straight line path, by some straight ray path error $e_S$. For the synthetic focusing algorithm, the time delay is calculated assuming a straight line path. The time of travel along that path can be determined by the refractive index image of the propagation medium. This is an improvement over the previous assumption that the speed of sound in constant throughout the imaged target.

If the error to the straight line path is known, the actual $\tau_A$ can be calculated from the combination of this error and $\tau_S$. Then $\tau_A$ can then be used to create an improved reflection property image with the synthetic focusing algorithm. The relationship between actual path AP and straight line path SP can be expressed as:

$$\tau_A = \tau_S + e_S \quad \text{(Equation 26)}$$

where:

$$\tau_A = \left(\frac{1}{c_0}\right)\int_0^l n(s) \cdot ds_A, \; ds_A \in AP, \quad \text{(Equation 27)}$$

$$\tau_S = \left(\frac{1}{c_0}\right)\int_0^l n(s) \cdot ds_S, \; ds_S \in SP, \quad \text{(Equation 27b)}$$

with $s_S$ being the path variable indicating the straight line path SP and $s_A$ being the path variable indicating the actual path AP. Using perturbation theory, the error can be approximated to avoid the difficult task of determining the actual path $s_A$.

To derive the error term, the refractive index expression can be expanded in a Taylor series with respect to y and z. Since $s_A \rightleftharpoons (x,y,z)$, the refractive index can be expressed in terms of x, y, and z, that is $n(s_A) \rightleftharpoons n(x,y,z)$, and since the path does not vary greatly from the straight line between the points, consider the path from x=0 to x=1 to be oriented along the x axis with small variations in the y and z directions. As such $n(s_A)$ can by written and expanded as:

$$n(x, y, z) = 1 + \epsilon h(x, y, z) = 1 + \quad \text{(Equation 28)}$$

$$\epsilon h[x, \epsilon f(x), \epsilon g(x)] \approx 1 + \epsilon h(x, 0, 0) + \epsilon^2 f(x)\frac{\partial h}{\partial y}\bigg|_{y=z=0} + \epsilon^2 g(x)\frac{\partial h}{\partial z}\bigg|_{y=z=0},$$

while $ds_A$ can be written as:

$$ds_A = \sqrt{dx^2 + dy^2 + dz^2} = dx\sqrt{1 + (y')^2 + (z')^2}, \quad \text{(Equation 29)}$$

where y'=dy/dx and z'=dz/dx. Noting that in the absence of refraction, y(x)=0 and z(x)=0, the expansion of y and z in terms of x is:

$$y(x) = 0 + \epsilon f(x) + O(\epsilon^2) \approx \epsilon f(x) \quad \text{(Equation 30a)}$$

and $$z(x) = 0 + \epsilon g(x) + O(\epsilon^2) \approx \epsilon g(x). \quad \text{(Equation 30b)}$$

And from this it is easily seen that:

$$y'(x) \approx \epsilon f'(x), \quad \text{(Equation 31a)}$$

and $$z'(x) \approx \epsilon f'(x). \quad \text{(Equation 31b)}$$

This makes the assumption that:

$$\epsilon f(x)\frac{\partial h}{\partial y} >> \epsilon^2 f^2(x)\frac{\partial^2 h}{\partial y^2} \quad \text{(Equation 32a)}$$

and $$\epsilon g(x)\frac{\partial h}{\partial z} >> \epsilon^2 g^2(x)\frac{\partial^2 h}{\partial z^2}. \quad \text{(Equation 32b)}$$

Then combining equations (29), (31), and expanding it is easily seen that:

$$\sqrt{1 + (y')^2 + (z')^2} = \sqrt{1 + (\epsilon f')^2 + (\epsilon g')^2} \approx \quad \text{(Equation 33)}$$

$$1 + \left(\frac{1}{2}\right)[(\epsilon f')^2 + (\epsilon g')^2].$$

To ease the notational burden let:

$$h(x, 0, 0) = h_0, \quad \text{(Equation 34a)}$$

$$\frac{\partial h}{\partial y}\bigg|_{y=z=0} = h_y, \quad \text{(Equation 34b)}$$

and $$\frac{\partial h}{\partial z}\bigg|_{y=z=0} = h_z. \quad \text{(Equation 34c)}$$

Then on expanding equation (27a) and simplifying, the time delay $\tau_A$ can be written as:

$$\tau_A = \left(\frac{1}{c_0}\right)\int_0^l [1 + \epsilon h_0 + \epsilon^2 f h_y + \epsilon^2 g h_z] \cdot \quad \text{(Equation 35)}$$

$$\sqrt{1 + (\epsilon f')^2 + (\epsilon g')^2}\, dx \approx \left(\frac{1}{c_0}\right)\int_0^l \left\{ 1 + \epsilon h_0 + \epsilon^2\left[ f h_y + g h_z + \left(\frac{1}{2}\right)(f'^2 + g'^2) \right] \right\} dx$$

Noticing that $(1+\epsilon h_0)$ is the non-refracting or straight line term in the integrand, equation (35) is equivalent to equation (27b) then:

$$\tau_S = \left(\frac{1}{c_0}\right)\int_0^l (1 + \epsilon h_0)\, dx \quad \text{(Equation 36)}$$

and

-continued $$e_S = \left(\frac{1}{c_0}\right)\int_0^l \left\{ \epsilon^2 \left[ fh_y + gh_z + \left(\frac{1}{2}\right)(f'^2 + g'^2) \right] \right\} dx \quad \text{(Equation 37)}$$

$$= \left(\frac{\epsilon^2}{c_0}\right)\left[ \int_0^l (fh_y + gh_z)dx + \left(\frac{1}{2}\right)\int_0^l (f'^2 + g'^2)dx \right]$$

where equation (37) is the desired error term. The first term of the right hand side of equation (37) can be explicitly written by integrating by parts and applying the boundary conditions $f(0)=f(l)=g(0)=g(l)=0$. Let:

$$u_1 = f, \; dv_1 = h_y dx, \; u_2 = g, \; dv_2 = h_z dx,$$

$$du_1 = f' dx, \; v_1 = \int_0^x h_y(x')dx', \; du_2 = g' dx,$$

and $$v_2 = \int_0^x h_z(x')dx',$$

then using these expressions in equation (37) and then simplifying yield:

$$e_S = -\left(\frac{\epsilon^2}{c_0}\right)\left( \int_0^l \left\{ f'(x)\left[ \int_0^x h_y(x')dx' \right] + \right. \right. \quad \text{(Equation 38)}$$

$$\left. \left. g'(x)\left[ \int_0^x h_z(x')dx' \right] \right\} dx \right) + \left(\frac{\epsilon^2}{2c_0}\right)\int_0^l [f'^2(x) + g'^2(x)]dx.$$

To evaluate this error term, expressions for $f'$ and $g'$ must be found. To derive expressions for $f'$ and $g'$, Fermat's principle of least time can be applied to equation (35). Using theory from the calculus of variations, the time delay $\tau_A$ will be a minimum if the ray path satisfies the Euler-Lagrange equations:

$$\frac{\partial F}{\partial f} - \left(\frac{d}{dx}\right)\left[\frac{\partial F}{\partial f'}\right] = 0 \quad \text{(Equation 39a)}$$

and $$\frac{\partial F}{\partial g} - \left(\frac{d}{dx}\right)\left[\frac{\partial F}{\partial g'}\right] = 0, \quad \text{(Equation 39b)}$$

where:

$$F(x, f, f', g, g') = \quad \text{(Equation 40)}$$

$$\left\{ 1 + \epsilon h_0 + \epsilon^2 \left[ fh_y + gh_z + \left(\frac{1}{2}\right)(f'^2 + g'^2) \right] \right\}.$$

Applying equation (40) to equation (39), it is easily seen that:

$$\frac{\partial F}{\partial f} = f, \quad \text{(Equation 41a)}$$

$$\frac{\partial F}{\partial g} = g', \quad \text{(Equation 41b)}$$

$$\left(\frac{d}{dx}\right)\left[\frac{\partial F}{\partial f'}\right] = f'', \quad \text{(Equation 42a)}$$

$$\left(\frac{d}{dx}\right)\left[\frac{\partial F}{\partial g'}\right] = g'', \quad \text{(Equation 42b)}$$

$$\frac{\partial F}{\partial f} = h_y, \quad \text{(Equation 43a)}$$

$$\frac{\partial F}{\partial g} = h_z, \quad \text{(Equation 43b)}$$

substituted into equation (3.16) yield the differential equations:

$$f''=h_y \quad \text{(Equation 44a)}$$

and $$g''=h_z. \quad \text{(Equation 44b)}$$

Solutions to these equations will yield a method to compute $e_S$.
One type of trial solution for $f$ and $g$ is respectively:

$$f(x) = \int_0^x (x - x')h_y(x')dx' + b_1 x + c_1, \quad \text{(Equation 45a)}$$

$$g(x) = \int_0^x (x - x')h_z(x')dx' + b_2 x + c_2, \quad \text{(Equation 45b)}$$

where $b_1$, $b_2$, $c_1$, and $c_2$ are constants. To verify that these are solutions, substitute equation (45) into equation (44). The Leibnitz formula for the derivative of an integral is:

$$\left(\frac{d}{d\alpha}\right)\int_{g(\alpha)}^{h(\alpha)} f(x, \alpha)dx = \int_{g(\alpha)}^{h(\alpha)} \left[\frac{\partial f(x, \alpha)}{\partial \alpha}\right]dx + \quad \text{(Equation 46)}$$

$$f[h(\alpha), \alpha]\left[\frac{dh(\alpha)}{d\alpha}\right] - f[g(\alpha), \alpha]\left[\frac{dg(\alpha)}{d\alpha}\right].$$

Then differentiating the trial function $f(x)$, $f'(x)$ can be written as:

$$f'(x) = \int_0^x h_y(x')dx' + (x - x)h_y(x) \cdot 1 - \quad \text{(Equation 47)}$$

$$(x - 0)h_y(0) \cdot 0 + b_1$$

$$= \int_0^x h_y(x')dx' + b_1.$$

Differentiating again, it is easily seen that:

$$f''(x)=h_y(x), \quad \text{(Equation 48)}$$

verifying the trial solution. Applying the boundary conditions $f(0)=f(l)=0$, the constants are seen to be:

$$b_1 = -\left(\frac{1}{l}\right)\int (l - x')h_y(x')dx', \quad \text{(Equation 49)}$$

-continued and $$c_1 = 0. \quad \text{(Equation 50)}$$

The particular solution can then be written as:

$$f(x) = \int_0^l (x - x') h_y(x') dx' - \left(\frac{x}{l}\right) \int_0^l (l - x') h_y(x') dx', \quad \text{(Equation 51)}$$

and $f'(x)$ is:

$$f'(x) = \int_0^x h_y(x') dx' - \left(\frac{1}{l}\right) \int_0^l (l - x') h_y(x') dx'. \quad \text{(Equation 52)}$$

Similarly it can be shown that:

$$g(x) = \int_0^l (x - x') h_z(x') dx' - \left(\frac{x}{l}\right) \int_0^l (l - x') h_z(x') dx', \quad \text{(Equation 53)}$$

and $g'(x)$ is:

$$g'(x) = \int_0^x h_z(x') dx' - \left(\frac{1}{l}\right) \int_0^l (l - x') h_z(x') dx'. \quad \text{(Equation 54)}$$

Using the expressions for $f'(x)$ and $g'(x)$ in equation (38) and simplifying, the error term becomes:

$$e_S = \left(\frac{\epsilon^2}{2c_0}\right)\left(\frac{1}{l}\right)\left\{\left[\int_0^l (l - x') h_y(x') dx'\right]^2 + \left[\int_0^l (l - x') h_z(x') dx'\right]^2\right\} - \left(\frac{\epsilon^2}{2c_0}\right) \int_0^l \left\{\left[\int_0^x h_y(x') dx'\right]^2 + \left[\int_0^x h_z(x') dx'\right]^2\right\} dx. \quad \text{(Equation 55)}$$

Noting that:

$$n(x,y,z) = 1 + \epsilon h(x,y,z) \quad \text{(Equation 56)}$$

and differentiating with respect to y and z at $y=z=0$ leads to:

$$\left.\frac{\partial n}{\partial y}\right|_{y=z=0} = \epsilon \left.\frac{\partial h}{\partial y}\right|_{y=z=0} \quad \text{(Equation 57a)}$$

and $$\left.\frac{\partial n}{\partial z}\right|_{y=z=0} = \epsilon \left.\frac{\partial h}{\partial z}\right|_{y=z=0} \quad \text{(Equation 57b)}$$

or:

$$\left(\frac{1}{\epsilon}\right) n_y(x) = h_y(x) \quad \text{(Equation 58a)}$$

and $$\left(\frac{1}{\epsilon}\right) n_z(x) = h_z(x). \quad \text{(Equation 58b)}$$

Then substituting equation (58) into equation (55) and simplifying yields:

$$e_S = \left(\frac{1}{2c_0}\right)\left(\frac{1}{l}\right)\left\{\left[\int_0^l (l - x') n_y(x') dx'\right]^2 + \left[\int_0^l (l - x') n_z(x') dx'\right]^2\right\} - \left(\frac{1}{2c_0}\right) \int_0^l \left\{\left[\int_0^x n_y(x') dx'\right]^2 + \left[\int_0^x n_z(x') dx'\right]^2\right\} dx, \quad \text{(Equation 59)}$$

which is an error expression in terms of the normal derivatives of the refractive index n(x,y,z) and can be evaluated.

From the truncated terms of the Taylor expansion, the conditions of validity for this model may be derived. Substituting equation (58a) into equation (32a) it is seen that:

$$\Delta y \cdot n_y(x) >> (\Delta y)^2 \frac{\partial^2 n(x)}{\partial y^2} \quad \text{(Equation 60a)}$$

where $f(x) = \Delta y$. Similarly substituting equation (58b) into equation (32b) it is seen that:

$$\Delta z \cdot n_z(x) >> (\Delta z)^2 \frac{\partial^2 n(x)}{\partial z^2} \quad \text{(Equation 60b)}$$

where $g(x) = \Delta z$.

Then actual time delay $\tau_A$ is calculated from the error $e_S$ and straight line approximation time delay $\tau_S$, which is the application of equation (26). This development differs from the development of Norton and Linzer in two ways. First, in the time-of-flight transmission case, the actual time delay $\tau_A$ is known from measurement and the straight line time delay $\tau_S$ is sought. Explicitly this is:

$$\tau_S = \tau_A - e_S. \quad \text{(Equation 61)}$$

Clearly equations (26) and (61) are equivalent. Second, the use of equations (56–58) allow equation (59) to be expressed directly in terms of the normal derivatives of the refractive index rather than expressing the error in terms of $h_y$ and $h_z$ and setting $\epsilon = 1$. Again, these approaches are equivalent, but equation (59) can be evaluated directly in terms of $n_y$ and $n_z$ without any assumptions or approximations.

The essence of this approach to improved resolution for image reconstructions is the formulation of a practical means of combining the reflection mode synthetic focusing algorithm and the perturbation concepts described above. Clearly this requires solving the problem of evaluating the error terms of equation (59) for the many paths in the synthetic focusing algorithm. It is reasonable to use a coarse grid for the refractive index image because the refractive index within an object will vary slowly. The grid coarseness may be determined by the object's refractive index variation with respect to equation (60a) and (60b). The reflection mode images provide a measure of how much energy is reflected toward the detector from the pixel point reflector. As such, strong reflections will be indicative of an interface with a rapid change of acoustic impedance (similar to a B-scan). Since acoustic impedance Z of a material is a function of density and speed of sound:

$$Z(s) = \rho(s) \cdot c(s),\qquad \text{(Equation 62)}$$

where $\rho(s)$ is the material density; a reflection signal is a measure of either the change in density or $c(s)$ or both. Because a strong reflection signal indicates a relatively rapid changing acoustic impedance, by its nature the synthetic focusing algorithm grid must be finer than that of the refractive index. More importantly, a coarsely sampled refractive index grid is adequate for excellent correction of reflection property images. Since the pixel grid of the refractive index image will be more coarse than the synthetic focusing algorithm grid, calculations of the path errors will be made more economically on the coarse grid. The path errors on the fine grid may be determined by interpolation of the coarse grid.

The actual time delay $\tau_A$ is the time traveled along the two line segments, transmitter to pixel and pixel to receiver (i.e., the straight line time delay $\tau_S$ of the above discussion) plus the error of those two line segment paths. Specifically:

$$\tau_A = \tau_S + e_{S_{sj}} + e_{S_{jm}} \qquad \text{(Equation 63)}$$

$$= \left(\frac{1}{c_0}\right)\left[\int_{x_s}^{x_j} n(s)ds_S + \int_{x_j}^{x_m} n(s)ds_S\right] +$$

$$e_{S_{sj}} + e_{S_{jm}}, ds_S \in SP;$$

where $e_{S_{sj}}$ is the straight line path error from the point $x_S$ to $x_j$ and $e_{S_{jm}}$ is the straight line path error from the point $x_j$ to the point $x_m$. A typical transmitter array uses the individual transducers in the array as both a transmitter and a receiver during data acquisition. Since it doesn't matter in the calculation of $e_S$ in equation (59) whether the path is from pixel to transmitter, transmitter to pixel, receiver to pixel, or pixel to receiver, the error along a particular straight line need only to be evaluated once. Then this calculation can be stored in memory and used for $e_{S_{sj}}$ or $e_{S_{jm}}$ when needed for a particular path.

Application of the equation (60) to tomographic applications means $n(s)$ is a two-dimensional function. Incorporation of the error expression with the scan geometry used here means that $n_z(x')=0$ in equation (60), which simplifies the evaluation. Evaluation of this simplified integral to the furthest pixel from the transducer by numerical methods requires intermediate summations. That is the integral $$\int_0^x n_y(x')dx'$$

can be evaluated at each $\Delta x$ until $x=1$. For J pixels in the refractive index image, this is J integral evaluations with each evaluation building on the last. These intermediate summations may be squared and stored in memory to be used again for the evaluation of the outer integral. For J pixels this means a total of 2 J evaluations for the second integral term. The first integral may also be evaluated at each pixel squared and store the final evaluation of the error term for a total of J integral evaluations. Thus the integral may be evaluated efficiently at the cost of a few temporary memory locations in the discrete circuit means.

The application of this scheme to an annular array scanner is straightforward as the path of propagation is assumed to be along the central axis of transducer. This idea can be extended to a scanner using a linear array. The straight line system set up here naturally fits into a polar coordinate system with the origin set at the transducer and the coordinate r set at the pixel in question (i.e., $x=0 \rightleftharpoons r=0$ and $x=1 \rightleftharpoons r=1$). The path errors can be calculated on the polar grid. Then an interpolation step may be used to determine the path errors on the original rectangular grid. This extension shows that the error at a pixel can be considered as a function of the distance between the transducer and the pixel. This error function will only be valid for the particular angle in this polar coordinate system, but it will be useful. Along this radial line, using interpolation, any pixel between the actual evaluated points (say on the coarse grid of refractive index) could have its path error estimated. Such an interpolation could be performed by a linear interpolation or a method requiring continuous derivatives such as cubic splines might be preferred. With this in mind, let the expression for the path error along the radial path at radial angle $\beta$, for radial coordinate r, be $e_\beta(r)$.

Figure 3:
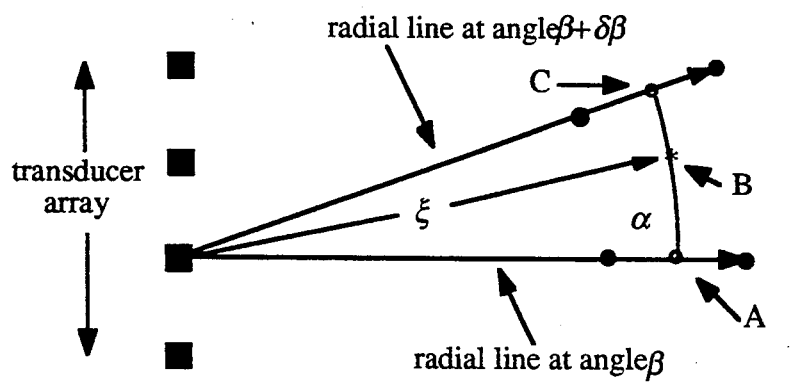
FIG. 3 is an illustration in polar grid format showing radial [etc]

The error calculation would be evaluated on the coarse refractive index grid for two reasons: (1) the computational cost would be prohibitive if the error were evaluated for every point on the finer synthetic focusing algorithm grid, (2) the error integral equation (59) is a function of the normal derivative of the refractive index, which is defined by the coarse grid. To estimate the pixels on the small grid, an interpolation step must be used. If the pixel would happen to be at radial distance $r=\xi$ with $r_i<\xi\leq r_{i+1}$, the previously discussed interpolation function $e_\beta(r)$ could be used to evaluate the path error, i.e., $e_\beta(\xi)$. If the point is also between two radial lines on the polar grid, the path error could be estimated by a weighted average between the path errors calculated at the same radial distance on the two adjacent radial lines. Explicitly this can be written:

$$e \approx \alpha \cdot e_\beta(\xi) + (1-\alpha) \cdot e_{\beta+\delta\beta}(\xi), \qquad \text{(Equation 64)}$$

where $\alpha$ is a weighting factor $0<\alpha<1$ proportional to the distance on the arc at $r=\xi$ to the radial line at angle $\beta$, and $\delta\beta$ is the incremental angle change between the two adjacent radial lines (see FIG. 3). Note, that if a linear interpolation is used along the radial lines and along the circular arcs, it is similar to bilinear interpolation.

Figure 4:
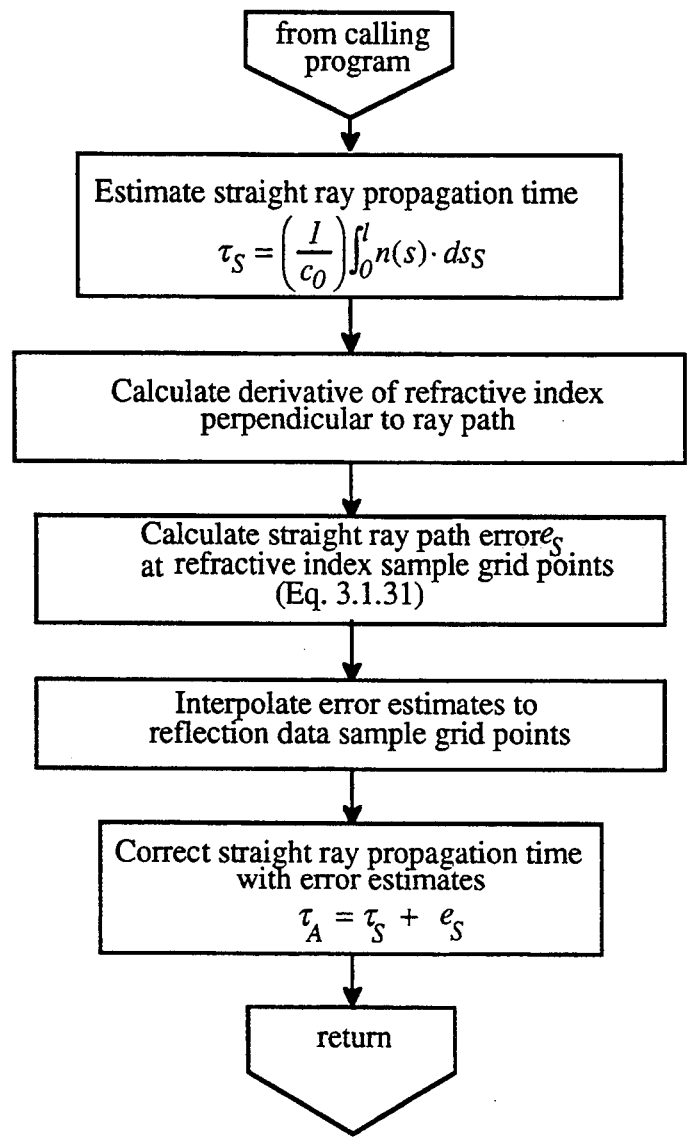
FIG. 4 is a flow sheet illustrating an implementation of a speed of sound error correction algorithm.

FIG. 4 shows a flow chart of how the correction algorithm may be constructed to estimate the time of propagation and implement the error correction procedure.

The summation of source/detector pair signals prior to the summation to produce a composite signal requires the proper registration of the signal phase fronts or an unfocused compound signal will result. The proper registration of the phase fronts requires knowledge of the source and detector positions to tolerances that depend on the frequency/wavelength of the signals. In B-scan imaging and the initial synthetic focusing experiments, estimates from the mechanical specifications of the transducer elements are used in the time spatial mapping of the signals. However the compound signals of the laboratory experiments showed evidence of misregistration in the signals from the source/detector pairs.

A form of the cross-correlation function may be used to compare the signals from the source/detector ring pairs. The choice of the time averaged cross-correlation function for comparing signals from these pairs has the advantage of directly determining the amount of misregistration. The time average cross-correlation function is defined for two statistically independent sampled stationary random processes $X(t)$ and $Y(t)$ to be:

$$\mathcal{R}_{XY}(\tau) = \lim_{T \to \infty} \frac{1}{T} \int_0^T X(t) Y^*(t + \tau) dt \qquad \text{(Equation 65)}$$

where $Y^*(t)$ is the complex conjugate of $Y(t)$. $\mathcal{R}_{XY}(\tau)$ shows the temporal relationship between the random processes. Use of equation (65) provides a function of the time delay $\tau$ where the maximum value of the function, at some $\tau_{max}$, indicates the time shift required to produce the best correlation between the two signals being compared. In other words $\tau_{max}$ is defined as the $\tau$ such that:

$$\mathcal{R}_{XY}(\tau_{max}) = \max_\tau [\mathcal{R}_{XY}(\tau)]. \qquad \text{(Equation 66)}$$

The idea of using correlation and peak detectors for the estimation of time delay has seen its use in the derivation of filtering systems (Knapp and Carter). The voltage signals from the annular array are finite length sampled sequences of time. Given this, a discrete version of $\mathcal{R}_{XY}(\tau)$ from sampled sequences would be an appropriate substitute for equation (65).

Application of a cross-correlation function usually requires the random processes to be stationary. A random process is strictly stationary or time invariant if the probability density function is invariant with respect to a time shift. This is a severe requirement and often difficult to verify. A random process $X(t)$ is said to be stationary in the wide-sense if $E[X(t_1)]$ is independent of $t_1$ and $E[X(t_1)X^*(t_2)]$ is dependent only on the time difference $t_2-t_1$. $E[.]$ is the expectation operator defined by:

$$E[X(t)] = \int_{-\infty}^{\infty} X \cdot f_X(X) dX \qquad \text{(Equation 67)}$$

where $f_X(X)$ is the probability density function of the random process $X(t)$. If the random processes $X(t)$ and $Y(t)$ are stationary in the wide-sense, then it is appropriate to apply equation (65) to the random processes. The voltage signals from the annular array scanner are known to have zero mean. It then follows that a reflection signal as a function of time from a source/detector pair q, at angle $\phi_l$, and position $y'_k$ is independent of time, that is $E[v_{q,\phi_l}(t,y'_k)]$ is independent in time. The reflections can occur at any time within the targeted range so the probability density function is assumed to be uniform over the variable t. A uniform probability distribution implies that the second-order probability function also will be independent of the time variable and $E[X(t_1)X^*(t_2)]$ will depend only on the time difference $t_2-t_1$. Therefore it may be assumed that the reflection voltage signals are stationary in the wide-sense and that equation (65) may be applied.

Figure 5:
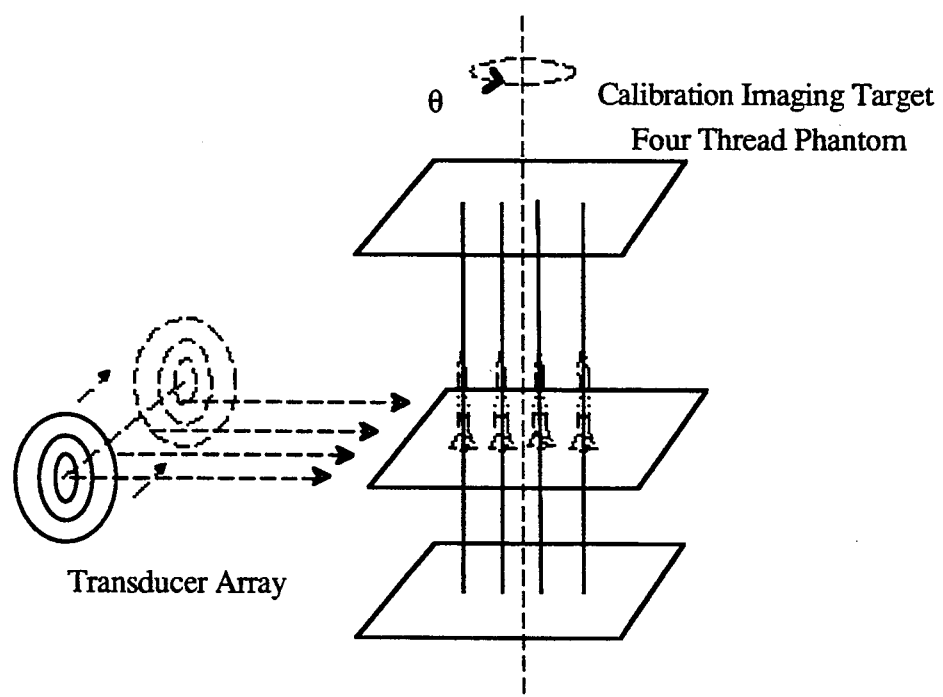
FIG. 5 is a schematic illustration of a four thread phantom used as a calibration imaging target [etc]

An imaging target constructed of four point reflectors spaced throughout the range of the acquired time signal was chosen to calibrate the annular array transducer. The point reflectors were constructed of small nylon threads and spaced so that the reflections of one thread would not interfere with the signal from the others (see FIG. 5). This was done to permit clean reflections so that the cross-correlation would not also have to sort out interfering reflections from the other threads. Transducer ringing prevents the transduced voltage signals from approximating impulses, even if acoustic impulses would be incident on the transducer. The ringing tends to spread the reflection signal over time requiring the physical separation of the threads. This can be modeled as a point spread function in the $x'$ direction.

The cross-correlation operator may be applied to functions of space as well as time. This is appropriate since the spatial representations of the reflection signals are finite length equally spaced discrete sequences. Comparison of pair signals will take place at the same view angle and lateral position, so for notational simplicity the angle and lateral position indices will be dropped. The comparison will take place between a reference source/detector pair of transducers, denoted by the index $q_R$, and source/detector pairs other than the reference pair, denoted by the index q (as was done in equation (18)). The estimated reflection signal for a given source/detector pair as a function of space is $\hat{v}_q(x'_j)$, and the sampled reflection signal for the reference source/detector pair as a function of space is $\hat{v}_{qR}(x'_j)$.

The individual reflection locations of the point reflectors can be compared via a modified and discrete version of equation (65). Modification of equation (65) is used for two reasons. First, the voltage signals to be correlated are functions of space rather than time as in equation (65). Second, the absolute amplitude of the cross-correlation function is not needed because $k_{max}$ is actually the desired parameter, so the specific magnitude of $\mathcal{R}_{XY}(k\Delta x)$ is not necessary, and the computation requirements may be reduced.

Define the discrete modified cross-correlation estimate between reference signal $\hat{v}_{qR}$ and arbitrary signal $\hat{v}_q$ to be:

$$\mathcal{R}_{\hat{v}_R \hat{v}_q}(k_{q,\xi}\Delta x') = \sum_{j=1}^{J} \hat{v}_{qR}(x'_{j,\xi}) \hat{v}_q^*(x'_{j,\xi} + k_{q,\xi}\Delta x') \qquad \text{(Equation 68)}$$

for all $q \neq q_R$ where the index $\xi$ indicates the index of the isolated thread and J indicates the length of the finite sequence. The number of spatial samples that $\hat{v}_q(x'_{j,\xi})$ needs to be shifted to have the best correlation with $\hat{v}_{qR}(x'_{j,\xi})$ may be determined by finding $k_{max(q,\xi)}$, where $k_{max(q,\xi)}$ is the $k_{q,\xi}$ such that:

(Equation 69)

$$\hat{R}_{\hat{v}R\hat{v}_q}(k_{max(q,\xi)}\Delta x') = \max_{k_{q,\xi}}[\hat{R}_{\hat{v}R\hat{v}_q}(k_{q,\xi}\Delta x')].$$

Using the inverse spatial to time mapping, $k_{max(q,\xi)}$ can be used to determine the number of samples the time domain signal must be shifted to achieve the best correlation between time signals. If one sample in the time domain maps into one sample in the spatial domain, then $k_{max(q,\xi)}$ may be used directly. This is roughly the case for the experiments using the annular array scanner.

$k_{max(q,\xi)}$ is the specific number of shifts needed for best correlation at the point of the thread reflections. The threads are spaced throughout the spatial domain of the central axis of the transducer. The thread reflections then provide a sampling of the time shifts needed to correlate the time signal $v_q(t_i)$ with the reference signal $v_{qR}(t_i)$ pair throughout the tomographic cross-section in the X direction at each lateral Y coordinate. From this sampling, interpolation may be used to create a time correction map for the intermediate points between the sample positions for each signal $v_q(t_i)$. For each time sample $t_i$ in each signal from source/detector pair q, let the correction term be denoted as $\delta t_{i,q}$. Then the new time to space mapping can be represented as $v_q(t_i + \delta t_{i,q}) \rightarrow \hat{v}_q(x'_j)$.

The time to spatial mapping will not be exact from sample to sample because of possible changes in test parameters, such as water temperature, which influences the speed of sound. In consideration of this fact, the correction term is only an estimate of the time change needed to achieve the best correlation between signals. This suggests application of this procedure to the updated spatial signal. This implies an iterative scheme would be appropriate if an appropriate error function may be found. If optimum correlation can be found between the reflection signals, $k_{max(q,\xi)}=0$ for all q and $\xi$. Noting that $k_{max(q,\xi)}$ may be positive or negative, this suggests a phased array error function of:

(Equation 70)

$$e_{pa} = \sum_{q,\xi} |k_{max(q,\xi)}|,$$

which will be reduced after each iteration. At optimum correlation between signals, $e_{pa}$ is expected to converge to zero because $k_{max(q,\xi)}$ will be an integer and the initial guess of the element positioning is assumed to be reasonably accurate.

Figure 6:
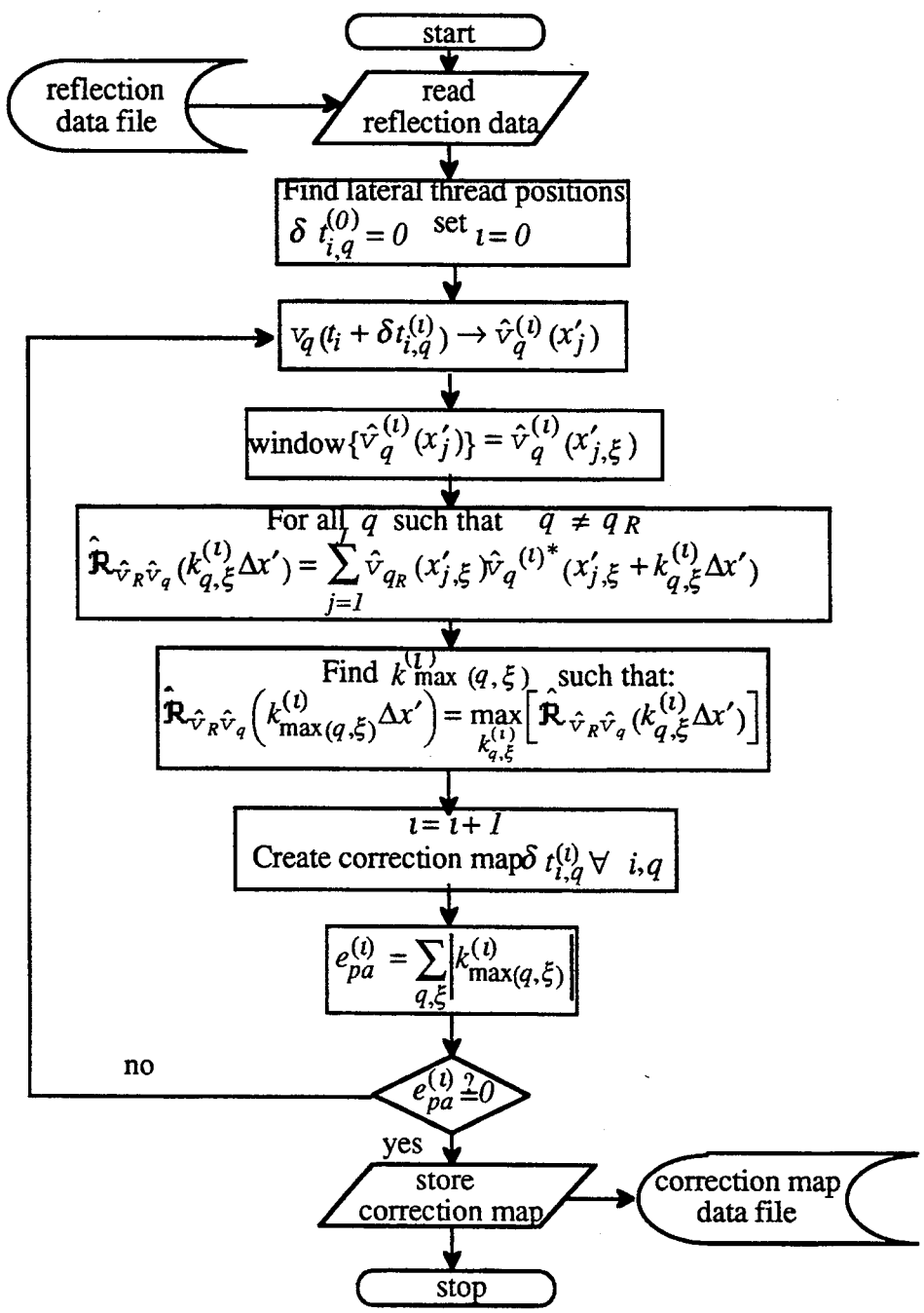
FIG. 6 illustrates in flow sheet format an implementation of the adaptive method to estimate the time delay corrections to phased array focusing.

FIG. 6 contains a flow chart of the original iterative procedure used to implement the adaptive corrections to the phase array focusing segment of the reconstruction process. In the figure, the superscript $^{(l)}$ has been used to indicate the particular iteration and l is the index of the iteration.

In equation (21) a compound image is created from the summation of B-scan images created from reflection data at different views. Blurring can occur in the compound image if misalignment between the images that make up the compound image is present. This step in the image reconstruction process combines reflection information gathered from many directions. Equation (20) showed the rotational transformation operator $T^R\{.\}$ used to rotate the images prior to the summation step.

Consider the rotational transformation equation (20) repeated and renumbered here for convenience:

(Equation 71)

$$\begin{bmatrix} x \\ y \end{bmatrix} = \begin{bmatrix} \cos\hat{\phi}_l & -\sin\hat{\phi}_l \\ \sin\hat{\phi}_l & \cos\hat{\phi}_l \end{bmatrix} \begin{bmatrix} (x' - \hat{x}'_0) \\ (y' - \hat{y}'_0) \end{bmatrix} + \begin{bmatrix} \hat{x}_0 \\ \hat{y}_0 \end{bmatrix}.$$

This rotational transformation will introduce misregistration errors in the compound image if any of the five variables $\hat{x}_0$, $\hat{y}_0$, $\hat{x}'_0$, $\hat{y}'_0$, or $\hat{\phi}_l$ are not estimated correctly. These variables represent estimates for the coordinates of the center of rotation in the reference view, the coordinates of the center of rotation in the rotated view, and the actual angle of rotation of the view. With the scanner, the approximate center of rotation and angle of rotation is known from mechanical measurements and movement of the positioning motor. However, random skips in the motor movement cannot be estimated. The mechanical measurements and predicted motor movement make a reasonable initial estimate for an optimization scheme.

Comparing images to check the alignment is a two-dimensional problem rather than the one-dimensional reflection signal case. This requires the extension of the one-dimensional cross-correlation operator to two dimensions. Suppose there are two statistically independent sampled stationary random process images that are functions of x and y. Then the discrete modified two-dimensional cross-correlation estimate between image views can be defined by:

$$\hat{R}_{P_R P_l}(n\Delta x, m\Delta y) =$$ (Equation 72)

$$\sum_{k=1}^{K} \sum_{j=1}^{J} P_{\phi_{IR}}(x_j, y_k) P_{\phi_l}^*(x_j + n\Delta x, y_k + m\Delta y)$$

for all $\phi_l \neq \phi_{IR}$ where $P_{\phi_{IR}}$ is the reference view of the single view images and $P_{\phi_l}$ is the notation for a single view image other than the reference view.

Then:

(Equation 73)

$$\hat{R}_{P_R P_l}(n_{max}\Delta x, m_{max}\Delta y) = \max_{n,m}[\hat{R}_{P_R P_l}(n\Delta x, m\Delta y)]$$

where $n_{max}$ then indicates the number of samples needed to shift $P_{\phi_l}(x_j, y_k)$ in the x direction and $m_{max}$ indicates the number of samples needed to shift $P_{\phi_l}(x_j, y_k)$ in the y direction to produce the best correlation between the sampled random process images $P_{\phi_{IR}}(x_j, y_k)$ and $P_{\phi_l}(x_j, y_k)$. The spatial offset values $n_{max}\Delta x$ and $m_{max}\Delta y$ can be used as direct error estimates of the center of rotation coordinate predicted in equation (71). They may be applied as error terms to correct $x_0$ and $y_0$ respectively and using equation (71) a new view correlated with respect to the $\hat{x}$ and $\hat{y}$ directions may be calculated.

This still leaves the problem of angular alignment. As mentioned this is caused by rotational motor skip or and nonuniformity in motor movement. Both factors will lead to a misalignment of the views in the f variable.

The same concept of correlating views can be applied with respect to angles. In theory the images could be transformed to polar coordinates using the center of rotation as the origin. Assuming for the moment that x and y are continuous variables, then using the transformations $p' = \sqrt{(x-\hat{x}_0)^2+(y-\hat{y}_0)^2}$ and $\phi' = \arctan[-(y-\hat{y}_0)/(x-\hat{x}_0)]$ a one-dimensional cross-correlation can be used to determine an angular misalignment. Writing this explicitly gives:

$$R_{p_R p_I}(\theta') = \frac{1}{2\pi} \int_0^{2\pi} \mathbf{p}_{\phi_{IR}}(\rho', \phi') \mathbf{p}_{\phi_I}^*(\rho', \phi' + \theta') d\phi'. \quad \text{(Equation 74)}$$

Then $v'_{max}$ can be found such that:

$$R_{p_R p_I}(\theta'_{max}) = \max_{\theta'}[R_{p_R p_I}(\theta')]. \quad \text{(Equation 75)}$$

$v'_{max}$ is an estimate of the error in the predicted angle of rotation $\hat{\phi}_l$ and may be used to correct the transformation in equation (71). An evaluation of the error in the predicted angle may be performed using the assumption that the initial estimates of center of rotation and angle of rotation are close to being correct. It is simple matter to perturb the angle of rotation estimate by an incremental angle $\hat{k}\Delta\hat{\phi}$ where $\hat{k}$ is an integer, apply this perturbed angle of rotation $\hat{\phi}_l + \hat{k}\Delta\hat{\phi}$ in equation (71) to determine the adjusted single view image $R_{p_R p_I}(v')$, and evaluate the expression:

$$\hat{R}_{p_R p_I}(\hat{k}\Delta\hat{\phi}) = \sum_{k=1}^K \sum_{j=1}^J \mathbf{p}_{\phi_{IR}}(x_j, y_k) \mathbf{p}_{\hat{\phi}_l + \hat{k}\Delta\hat{\phi}}(x_j, y_k) \quad \text{(Equation 76)}$$

for all $q_{\phi_I} \neq q_{\phi_{IR}}$ for a limited number of values of $\hat{k}$. Then because the initial estimate of $\hat{\phi}_l$ was close, the angular offset $\hat{k}\Delta\hat{\phi}$ for the best angular correlation given by $\hat{k}_{max}$ such that:

$$\hat{R}_{p_R p_I}(\hat{k}_{max}\Delta\hat{\phi}) = \max_{\hat{k}}[\hat{R}_{p_R p_I}(\hat{k}\Delta\hat{\phi})] \quad \text{(Equation 77)}$$

will be among the limited number of values of $\hat{k}$ evaluated. Once $\hat{k}_{max}$ is determined with respect to angle, equations (72) and (73) may be applied to the new image to determine if a change in angle altered the corrected center of rotation offset. If so, then the $\hat{x}_0$ and $\hat{y}_0$ values may again be corrected. However the angle $\hat{\phi}_l$ should again be checked by equations (76) and (77) and corrections applied if needed. This procedure continues set in an iterative manner until $\hat{x}_0$, $\hat{y}_0$, and $\hat{\phi}_l$ no longer need correction. At this point, the views will be aligned and the views may be summed to create the compound image of equation (21).

Figure 7A:
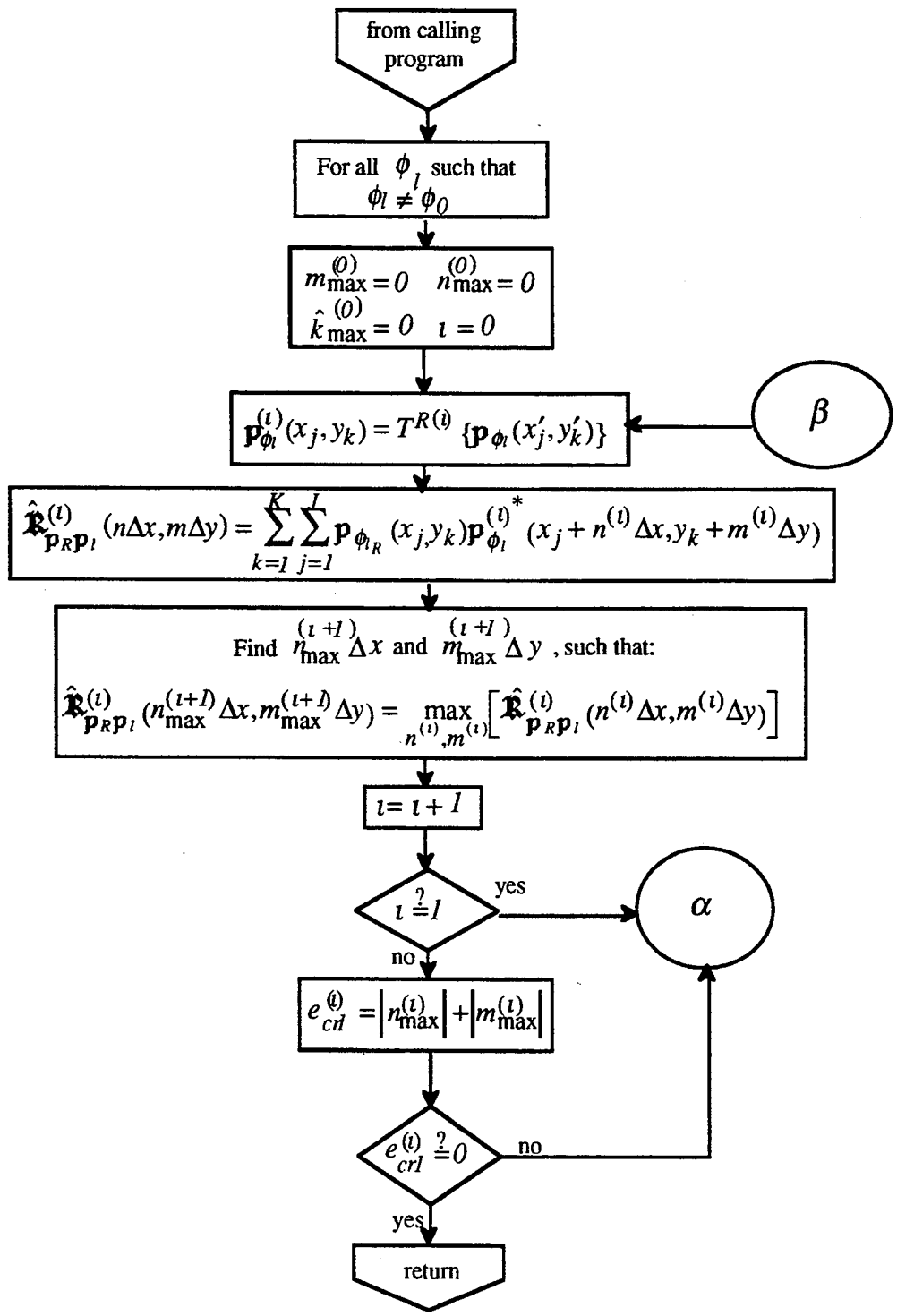
FIG. 7 (FIGS. 7a. and 7b.) illustrates in flow sheet format an implementation of the adaptive method to estimate the center of rotation and angle of rotation corrections in the image summation step.
Figure 7B:
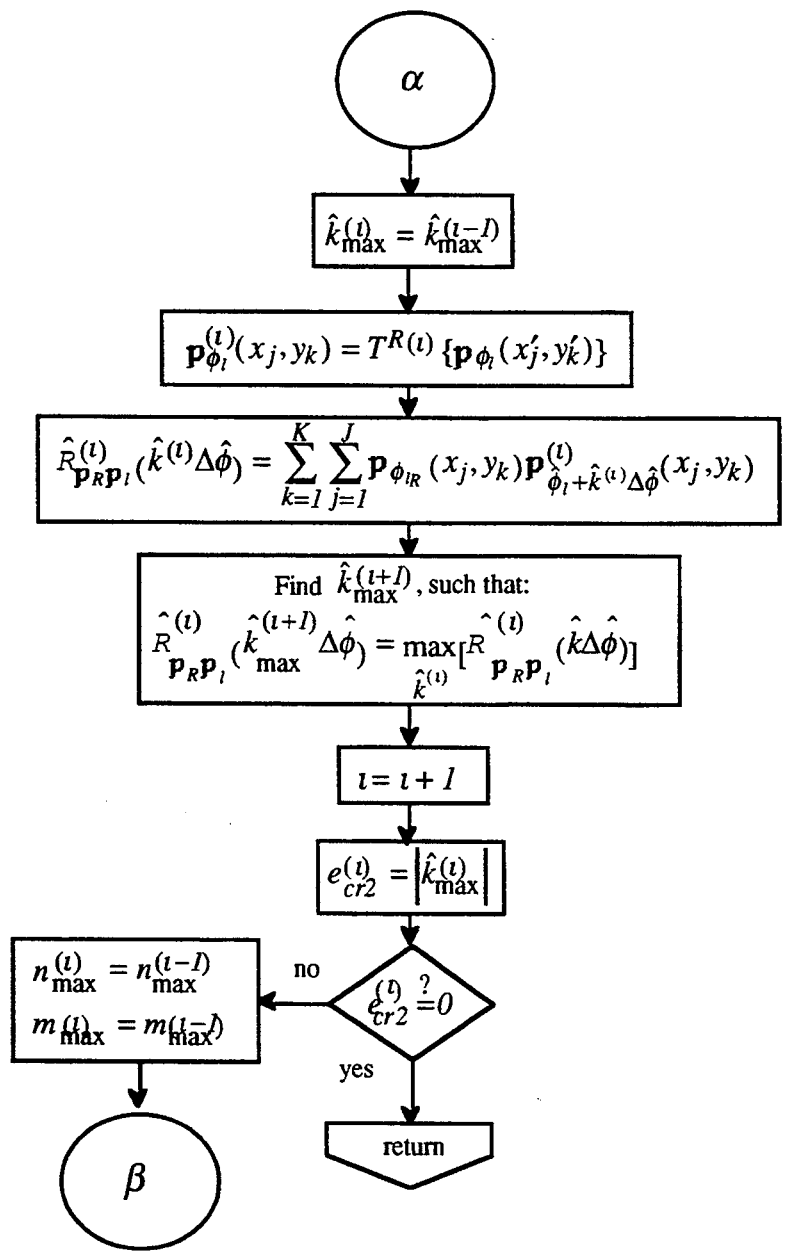

FIGS. 7a and 7b contains a flow chart of the original iterative procedure used to implement the adaptive corrections to the view alignment segment of the reconstruction process. In the figure, the superscript $(l)$ has been used to indicate the particular iteration and l is the index of the iteration. The transformation $T^{R(l)}\{.\}$ is the notation for the correction transformation operator:

$$\begin{bmatrix} x \\ y \end{bmatrix} = \quad \text{(Equation 78)}$$

-continued $$\begin{bmatrix} \cos(\hat{\phi}_l + \hat{k}_{max}^{(t)}\Delta\hat{\phi}) & -\sin(\hat{\phi}_l + \hat{k}_{max}^{(t)}\Delta\hat{\phi}) \\ \sin(\hat{\phi}_l + \hat{k}_{max}^{(t)}\Delta\hat{\phi}) & \cos(\hat{\phi}_l + \hat{k}_{max}^{(t)}\Delta\hat{\phi}) \end{bmatrix} \begin{bmatrix} (x' - \hat{x}'_0) \\ (y' - \hat{y}'_0) \end{bmatrix} +$$

$$\begin{bmatrix} \hat{x}_0 + n_{max}^{(t)}\Delta x \\ \hat{y}_0 + m_{max}^{(t)}\Delta y \end{bmatrix}$$

where iterative corrections have been made to center of rotation coordinates $\hat{x}_0$ and $\hat{y}_0$, and also the angular rotation estimate $\hat{\phi}_l$. This algorithm makes use of two error functions that are made up of the center rotation pixel error function:

$$e_{cr1}^{(t)} = |n_{max}^{(t)}| + |m_{max}^{(t)}| \quad \text{(Equation 79)}$$

and the angular rotational error function:

$$e_{cr2}^{(t)} = |\hat{k}_{max}^{(t)}|. \quad \text{(Equation 80)}$$

The point spread function is the response of a two-dimensional linear system to a point source input. The point spread function has the effect of blurring what should appear as a point source in the output of the linear system. An imaging system such as synthetic focusing algorithm can be modeled as a linear system. The modeling of the synthetic focusing algorithm as a linear system allows analysis and estimation of the point spread function. Steps may then be taken to remove the point spread function and therefore sharpen the image with this estimated point spread function.

In general, a system S operates on an input x to produce an output y:

$$y = S\{x\}. \quad \text{(Equation 81)}$$

A linear system has an input to output relationship of:

$$ay_1 + by_2 = S\{ax_1 + bx_2\} \quad \text{(Equation 82)}$$

where $x_1$ and $x_2$ are separate inputs producing separate outputs of $y_1$ and $y_2$ respectively and a and b are scalar multipliers. A shift invariant system has an input to output relationship of:

$$y(t-T) = S\{x(t-T)\} \quad \text{(Equation 83)}$$

where x and y are functions of the variable t while T is some shift in t. A linear shift invariant system has both properties. The reconstruction system described above can be broken into a set of processing steps. Some of the steps fit the description of a linear shift invariant system, such as the summations of equations (10) and (21). However, the time to spatial mapping step, which is subject to varying shifts of the input with respect to the output as a function of the acoustic velocity of the target, is not a linear shift invariant system.

The procedure used to create the reconstruction of the reflection based image $\hat{r}(x,y)$ was described above. Note that the continuous notation will be used to develop the concepts. The implementation of these concepts will be performed discrete circuit means using discretely sampled representations of the functions. It is well known that this estimate is corrupted by a point spread function. The influence of the point spread function on the estimate of the reflection image can be modeled as:

$$\hat{R}(x, y) = \int_{-\infty}^{\infty} \int_{-\infty}^{\infty} \tilde{R}(\zeta, \eta) h(x - \zeta, y - \eta) d\zeta d\eta \quad \text{(Equation 84)}$$
$$= \tilde{R}(x, y) ** h(x, y)$$

where $\tilde{R}(x,y)$ is the actual image of the reflection properties and $h(x,y)$ is the point spread function of the compound image. This equation represents a two-dimensional convolution and the tools of linear shift-invariant system theory may be used to analyze and improve the image estimate.

The single view image has corruption in the axial direction because of the transducers used to convert the excitation impulse and reflection signal introduces ringing to the wave form. As discussed above, the transfer function of the transducer was assumed to be an all pass system, that is $h_{Tsm}(t) = \delta(t)$. This approximation ignores the ringing, which is one source of the point spread function. Another contribution to image blurring is the lateral point spread function due to the width of the ultrasonic beam at the focal point. The width of the beam is generally wider than the lateral dimension of the pixel. The beam intensity tapers off as a function of distance from the central axis of the annular array transducer. This means that signals from reflectors not on the central axis will be recorded at the detector along with the reflections due to points that are on the central axis. The reflection contributions from the off axis reflectors will be reduced compared to the reflectors along the central axis. These corruptions to the reflected signals are present in each single view.

The summation process of equation (21) introduces a rotational transform to the single view image estimates and smears the point spread function over the angle of $\phi_I$ for each view. This adds additional complexity to the point spread function. Attempts to remove the effects of the point spread function require estimates of the point spread function and an inverse filtering operation that take into account each of these factors. Hiller and Ermert have tried to characterize this point spread function by theoretical means. According to this invention, the reconstructions are calibrated from a target that has a known reflection image. Reflection data from this target will be collected and the image reconstructed by the usual means described above. Then using a model of the true reflection image from this target, the point spread function will be estimated. Corrections for the point spread function will be implemented by the various techniques for implementing inverse filters.

Suppose that a scanner is set up to collect data in an identical way for each imaging target of interest and the reconstruction procedure is also the same. It then follows that the point spread function, which is a function of the reconstruction procedure, will be the same for each reconstruction. To see how an estimate of the point spread function may be obtained, apply the two-dimensional Fourier transform to equation (76):

$$\mathcal{F}_2\{\hat{R}(x, y)\} = \hat{R}(f_x, f_y) = \mathcal{F}_2\{\tilde{R}(x, y) ** h(x, y)\} = \quad \text{(Equation 85)}$$
$$\tilde{R}(f_x, f_y) \cdot H(f_x, f_y).$$

Suppose an imaging target has a known true reflection image $\tilde{R}(x,y)$. Also suppose this imaging target has been imaged and the estimated reconstruction is $\hat{R}(x,y)$. Then an estimate of the point transfer function may be obtained using the Fourier transforms of these $\tilde{R}(x,y)$ and $\hat{R}(x,y)$. This estimate is seen by rearranging equation (77) to show:

$$H(f_x, f_y) = \frac{\hat{R}(f_x, f_y)}{\tilde{R}(f_x, f_y)}. \quad \text{(Equation 86)}$$

If this quantity may be calculated, an inverse filter $G_I(f_x,f_y)$ may be applied to the image estimates to provide a filtered version the image estimate $\hat{R}_F(f_x,f_y)$ in the frequency domain:

$$\hat{R}_F(f_x, f_y) = \tilde{R}(f_x, f_y) \cdot H(f_x, f_y) \cdot G_I(f_x, f_y) = \tilde{R}(f_x, f_y) \quad \text{(Equation 87)}$$

where:

$$G_I(f_x, f_y) = \frac{1}{H(f_x, f_y)}. \quad \text{(Equation 88)}$$

As equation (80) implies, if $G_I(f_x,f_y)$ exists, then the filtered estimate of the image will be perfect. However, when $H(f_x,f_y)=0$ then $G_I(f_x,f_y)$ is undefined. This is a serious problem when it is considered that the reflected signals are bandlimited, which means that above some spatial frequencies $f_{xmax}$ and $f_{ymax}$ the point transfer function will certainly be zero. Also the presence of noise in the sampled signal can cause serious degradation in the estimate of $H(f_x,f_y)$.

One method of handling this problem is to constrain the inverse filter so that it is zero when the magnitude of the point transfer function is less than some small value. Denoting the constrained inverse filter as $G_{CI}(f_x,f_y)$, then the constrained inverse filter may be defined as:

$$G_{CI}(f_x, f_y) = \begin{cases} \frac{1}{H(f_x, f_y)}, & \text{when } |H(f_x, f_y)| > \epsilon \\ 0, & \text{otherwise} \end{cases} \quad \text{(Equation 89)}$$

where $\epsilon$ is the smallest value permitted for the point transfer function. A problem with a constraint such as this is that sharp edges in the target will not be represented perfectly because the high frequency components needed to reconstruct the target will have been set to zero. In fact a two-dimensional analog to the Gibbs phenomena may be present in the reconstruction.

Another problem that was only briefly mentioned is the influence of noise on the image estimate. Suppose $\tilde{R}(f_x,f_y) \cdot H(f_x,f_y)$ is replaced in equation (78) by $\tilde{R}(f_x,f_y) \cdot H(f_x,f_y) + N(f_x,f_y)$ which represents the actual image corrupted by noise with the noise spectrum being $N(f_x,f_y)$. Application of $\tilde{R}(f_x,f_y) \cdot H(f_x,f_y) + N(f_x,f_y)$ to equation (79) would yield a corrupt estimate of the point transfer function. When $N(f_x,f_y) > \tilde{R}(f_x,f_y) \cdot H(f_x,f_y)$, the noise would dominate the estimate of $H(f_x,f_y)$ and the inverse filter $G_I(f_x,f_y)$. If an estimate of $N(f_x,f_y)$ could be obtained, then the constrained inverse filter of equation (89) could be modified to prevent this. Using $N(f_x,f_y)$ as a limiting quantity, equation (89) could be written as:

$$G_{CI}(f_x, f_y) = \begin{cases} \dfrac{1}{H(f_x, f_y)}, & \text{when } \alpha_1 \cdot |\tilde{R}(f_x, f_y) \cdot H(f_x, f_y) + N(f_x, f_y)| > |N(f_x, f_y)| \\ 0, & \text{otherwise} \end{cases} \quad \text{(Equation 90)}$$

where $\alpha_1$ is a scale factor used to control the constraint.

Another method in dealing with the noise problem is the use of optimum filter theory, which leads to inverse Wiener filters. This technique uses the criteria of the minimum mean-square error between the actual reflection image and the estimated reflection image to determine the filter coefficients. If there is no correlation between signal and noise, then the inverse Wiener filter.

Suppose there is a signal $\tilde{r}(x,y)$ convolved with an impulse response function $h(x,y)$ that is corrupted by noise $n(x,y)$ which yields an estimated signal $\hat{\tilde{r}}(x,y)$, that is:

$$\hat{\tilde{r}}(x,y) = \tilde{r}(x,y) ** h(x,y) + n(x,y) \quad \text{(Equation 91)}$$

where ** indicates a two-dimensional convolution.

Next suppose there is a filter function $g_W(x,y)$ that will be convolved with the estimated signal to yield a filtered signal $\hat{\tilde{r}}_F(x,y)$, that is:

$$\hat{\tilde{r}}_F(x,y) = \hat{\tilde{r}}(x,y) ** g_W(x,y), \quad \text{(Equation 92)}$$

where the function $g_W(x,y)$ is chosen to be optimum in the minimum mean-square error sense of the filtered signal $\hat{\tilde{r}}_F(x,y)$ with respect to the initial signal $\tilde{r}(x,y)$. $g_W(x,y)$ is usually known as an optimum or inverse Wiener filter.

To derive $g_W(x,y)$ to meet the mean square-error criteria, define an error function $e$ that is the square of the modulus of the difference between the $\tilde{r}(x,y)$ and $\hat{\tilde{r}}_F(x,y)$, that is:

$$e = \frac{1}{2} \int_{-\infty}^{\infty} \int_{-\infty}^{\infty} |\tilde{r}(x,y) - \hat{\tilde{r}}_F(x,y)|^2 dx dy. \quad \text{(Equation 93)}$$

Minimizing this quantity with respect to the filter function in the spatial domain yields:

$$\frac{\partial e}{\partial g_W(\xi, \eta)} = 0 = \frac{\partial \left\{ \frac{1}{2} \int_{-\infty}^{\infty} \int_{-\infty}^{\infty} |\tilde{r}(x,y) - \hat{\tilde{r}}(x,y) ** g_W(x,y)|^2 dx dy \right\}}{\partial g_W(\xi, \eta)}. \quad \text{(Equation 94)}$$

Carrying out the differentiation at each spatial point of $\xi$ and $\eta$, equation (94) becomes:

$$0 = [\tilde{r}(\xi,\eta) - \hat{\tilde{r}}(\xi,\eta)  g_W(\xi,\eta)]  [-\hat{\tilde{r}}^*(\xi,\eta)] \quad \text{(Equation 95)}$$

for each $\xi$ and $\eta$. Then applying the two dimensional Fourier transform to equation (95) and rearranging terms yields:

$$\tilde{R}(f_x,f_y) \cdot \hat{\tilde{R}}^*(f_x,f_y) = |\hat{\tilde{R}}(f_x,f_y)|^2 \cdot G_W(f_x,f_y) \quad \text{(Equation 96)}$$

where the upper case letters indicate the spatial frequency representation of the spatial domain functions represented by the lower case letters. Then explicitly including the terms that make up $\hat{\tilde{R}}(f_x,f_y)$ in equation (96) and rearranging gives:

$$G_W(f_x, f_y) = \frac{\tilde{R}(f_x,f_y) \cdot \hat{\tilde{R}}^*(f_x,f_y)}{|\hat{\tilde{R}}(f_x,f_y)|^2} \quad \text{(Equation 97)}$$

$$= \frac{\tilde{R}(f_x,f_y) \cdot [\tilde{R}^*(f_x,f_y) \cdot H^*(f_x,f_y) + N^*(f_x,f_y)]}{|\tilde{R}(f_x,f_y)H(f_x,f_y) + N(f_x,f_y)|^2}$$

It is assumed that there is no correlation between the signal $\tilde{R}(f_x,f_y)$ and noise $N(f_x,f_y)$ so the cross terms involving the original signal and noise go to zero. Using this assumption, equation (97) becomes:

$$G_W(f_x,f_y) = \frac{\tilde{R}(f_x,f_y) \cdot \tilde{R}^*(f_x,f_y) \cdot H^*(f_x,f_y)}{|\tilde{R}(f_x,f_y)H(f_x,f_y)|^2 + |N(f_x,f_y)|^2} \quad \text{(Equation 98)}$$

which is an expression for the inverse Wiener filter.

Application of this filter to some image reconstruction $\hat{\tilde{R}}_1(f_x,f_y)$ will yield:

$$\hat{\tilde{R}}_1(f_x,f_y) \cdot G_W(f_x,f_y) = [\tilde{R}_1(f_x,f_y)H(f_x,f_y) + N(f_x,f_y)] \cdot G_W(f_x,f_y) \quad \text{(Equation 99)}$$

$$= \frac{\tilde{R}_1(f_x,f_y) \cdot |\tilde{R}(f_x,f_y) \cdot H(f_x,f_y)|^2}{|\tilde{R}(f_x,f_y)H(f_x,f_y)|^2 + |N(f_x,f_y)|^2}$$

where $\tilde{R}_1(f_x,f_y)$ is the true image of this reconstruction. When the noise levels are small, that is when $|\tilde{R}(f_x,f_y)H(f_x,f_y)|^2 >> |N(f_x,f_y)|^2$, the filter behaves as an ideal inverse filter. When the noise levels are large, that is when $|N(f_x,f_y)|^2 >> |\tilde{R}(f_x,f_y)H(f_x,f_y)|^2$, then $G_W \rightarrow |\tilde{R}|^2 H^*/|N|^2$. A constraint also may be put in on $G_W(f_x,f_y)$, that the filter will be zero above spatial frequencies $f_{xmax}$ and $f_{ymax}$, where the bandwidth of the imaging system has been exceeded.

To this point it was assumed that $\tilde{r}(x,y)$ has been known and could be used to generate the various filters described above. This requires the choice of an imaging target with a known $\tilde{r}(x,y)$. A logical choice would be a target that contains point reflectors spaced so the point spreading would not interfere with the reflected signals of the other point reflectors. The target used (see FIG. 5), which consists of four threads, would be the logical choice. It also fits into the idea of single calibration object to calibrate the scanner and entire reconstruction algorithm.

The four threads may be measured to determine the expected thread shape and can be used to determine $\tilde{r}(x,y)$. If the thread diameters were much smaller than a wavelength of the incident acoustic wave and on the order of the spatial sample width, the threads would appear as two-dimensional impulses in the image. Should this be the case, replicas of the point spread function would be centered at the location of each impulse in the estimated image. However, because this imaging system has finite bandwidth transducers, perfect impulses would be impossible to reconstruct. Also, the thread sizes below one wavelength were barely detectable during the time of flight center of rotation calibration (using 5 MHz transducers the wavelength in water is 0.300 mm). The compromise was to choose thread sizes small enough to give a close approximation to an impulse, but still large enough to allow detection in the time of flight data acquisition. Two sizes of threads were chosen, 0.300 mm to provide half wavelength reflectors for the reflection scanner and 0.500 mm to provide a more detectable object for the time of flight calibration.

The actual image could then be modeled as a circ functions with a radii equal to the radii of the threads with the functions positioned at the locations of the threads. However, finite bandwidth signals would not permit perfect reconstruction of circ functions because of the high frequency content of the function's discontinuities. The compromise here was to assume the shape of two-dimensional Gaussian functions, that is the expected thread shape in the image would be:

$$\tilde{r}_\xi(x, y) = a \cdot \exp\left[\frac{-(x - x_\xi)^2}{2\sigma_{x\xi}^2}\right] \exp\left[\frac{-(y - y_\xi)^2}{2\sigma_{y\xi}^2}\right] \quad \text{(Equation 100)}$$

where $\xi$ is the index of the thread, $\sigma_x$ and $\sigma_y$ are width scaling factor in the x and y directions respectively, and $\alpha$ is an amplitude scaling factor. The total expected image was a summation of the expected thread functions, that is:

$$\tilde{r}(x, y) = \sum_{\xi=1}^{4} \tilde{r}_\xi(x, y) = \sum_{\xi=1}^{4} a \cdot \exp\left[\frac{-(x - x_\xi)^2}{2\sigma_{x\xi}^2}\right] \exp\left[\frac{-(y - y_\xi)^2}{2\sigma_{y\xi}^2}\right] \quad \text{(Equation 101)}$$

where four (4) is the number of threads used in the calibration imaging target.

Collecting the reflection data and application of equation (101) to the inverse filters described above allows calculation of the filters. The filters can then be applied to the reconstructions to provide a filtered version of the reconstruction. The synthetic focusing algorithm is a backprojection procedure. Application of the type of filters described in here takes the synthetic focusing algorithm into the realm of a filtered backprojection method.

The impulse response function $h(x,y)$ has a finite region of support. Spacing of the threads to insure there is no overlap of the response to the thread reflections permits the isolation of the response to each thread so they may be handled individually. The isolation is accomplished by standard windowing techniques on the spatial reconstructions. This isolation of the four threads can provide four estimates of the impulse response function. The four estimates may be correlated and averaged to reduce the influence on the inverse and constrained inverse filters described above.

The paragraphs above describe methods of filtering the compound image after summation of the various views. Another approach may be taken, which is to filter the individual views before summation. Since the point spread functions are derived by transducer ringing and a beam width that spans more that one sample of $y'_k$, then there will be no angular component to the point spread function of the individual views. Representing this mathematically it is seen from equation (19) that the individual view model can be rewritten as:

$$p_{\phi}(x'_j, y'_k) = \text{env}_{x'}\{v_\phi(x'_j, y'_k)\} \ast\ast h_\phi(x'_j, y'_k) \quad \text{(Equation 102)}$$

where $h_\phi(x'_j, y'_k)$ indicates the point spread function of a single view.

In another model, the point spread function due to the transducer ringing may be separated out as the component of the point spread function $h_x(x'_j)$ in the x' direction and component of the point spread function $h_y(y'_k)$ in the lateral or y' direction. This may be explicitly written as:

$$p_{\phi}(x'_j, y'_k) = \text{env}_{x'}\{v_\phi(x'_j, y'_k)\} \ast\ast h_x(x'_j) \cdot h_y(y'_k). \quad \text{(Equation 103)}$$

Looking at the form of equation (103) it is seen that one-dimensional inverse filters may be applied to remove $h_x(x'_j)$ and $h_y(y'_k)$, but if both are to be filtered out, it is virtually the same computational complexity as a two-dimensional filtering process.

The concepts of the inverse filtering process apply readily to single views as well as compound views and can provide a filtered version of the single view projection $pF_\phi(x'_j, y'_k)$ prior to summation where:

$$pF_\phi(x'_j, y'_k) = p_\phi(x'_j, y'_k) \ast\ast g(x'_j, y'_k) \quad \text{(Equation 104)}$$

and g indicates one of the inverse filters described above. Then the summation on the result of equation (104) becomes:

$$\tilde{r}_{F\phi}(x_j, y_k) = \sum_{l=1}^{L} pF_\phi(x_j, y_k) = \sum_{l=1}^{L} T^R\{pF_\phi(x'_j, y'_k)\}. \quad \text{(Equation 105)}$$

If the inverse filtering on both the compound image and the presummation views can be applied ideally the resulting image should be the same. However, noting that the inverse filter can't remove $h_\phi(x'_j, y'_k)$ perfectly, the remnant of the point spread function will be smeared by the rotational transformation in equation (105) and some differences will be seen. Note that the filtering process on the compound image will take the smearing into account and should be expected to provide a better estimated reconstruction.

The filtering of the compound image is done once. The filtering in the presummation step is applied to each individual view. The filtering of the compound image is less expensive computationally assuming there are more than one view in the summation (if there is only one view then both processes revert to a filtered B-scan). Also note that if one of the causes of the point spread function was not recognized, this estimation procedure and subsequent inverse filtering process will still attempt to remove its distorting effect on the image reconstruction.

Figure 8:
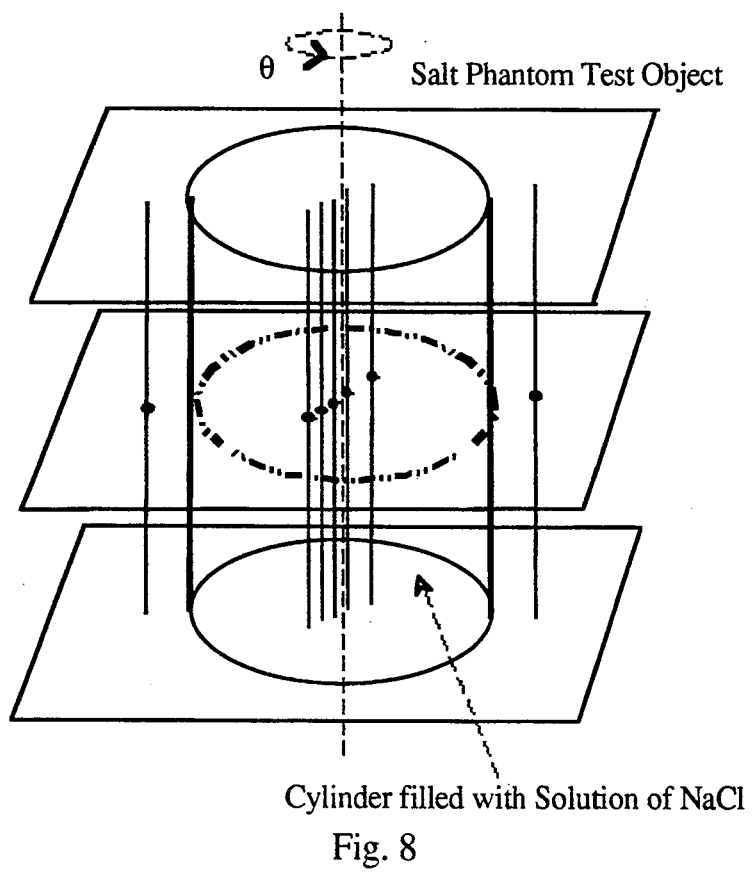
FIG. 8 is a schematic illustration of a salt phantom test object comprising an arrangement of five nylon threads inside a tiny "Plexiglas" cylinder filled with a salt solution, the threads and cylinder being perpendicular to the image plane.

To demonstrate the improvements of the invention, a test object, a salt phantom, was chosen as an imaging target to perform imaging tests. This phantom was designed to test the speed of sound correction algorithms. The desired properties of the object were to have both point reflectors and variations in the speed of sound. The salt phantom is the test object used to test the speed of sound correction algorithms and provide a means of quantitative evaluation of these algorithms. FIG. 8 shows a diagram of the salt phantom.

The cylinder of this imaging target is filled with salt water. Salt concentrations increase the speed of sound when introduced to water. The general expression for the speed of sound in water as a function of salt concentration and temperature is given by:

$$c = A(S°/_{oo}) + B(S°/_{oo})^{3/2} + C(S°/_{oo})^2 + c_0 \quad \text{(Equation 106)}$$

where $$A = 1.383567 - 6.763710 \times 10^{-3}T - 2.8535508 \times 10^{-4}T^2 + 5.837103 \times 10^{-6}T^3$$

$$B = -1.602384 \times 10^{-2} - 2.956150 \times 10^{-3}T + 1.894136 \times 10^{-4}T^2 - 2.857495 \times 10^{-6}T^3$$

$$C = 1.351183 \times 10^{-3} + 3.126867 \times 10^{-4}T - 2.0011184 \times 10^{-5}T^2 + 3.020154 \times 10^{-7}T^3 \quad \text{(Equation 107)}$$

and $$c_0 = 1402.38754 + 5.03711129T - 5.80852166 \times 10^{-2}T^2 + 3.34198834 \times 10^{-4}T^3 \quad \text{(Equation 108)}$$

is the speed of sound of water without salt, T is temperature in degrees Celsius as determined by Millero, supra. The salinity $S°/_{oo}$ is given by:

$$S°/_{oo} = 9.968077A\% - 0.048122, \quad \text{(Equation 109)}$$

where $$A\% = \frac{\text{(grams NaCl)}}{\text{(100 ml H}_2\text{O)}} \quad \text{(Equation 110)}$$

The threads in the salt phantom all have diameters of 0.300 mm, the cylinder diameter is 25.4 mm (1 inch), and the cylinder wall thickness is 0.500 mm. It is assumed that the effect of the threads on sound velocity variations in the image will be negligible because the wall and thread thickness is small. The concentration of the salt was chosen to provide a speed of sound of 1525 m/sec. at 20° C. This translated to 3.8 grams of NaCl per 100 ml of water. This value was chosen to show the effect that a typical variation of the speed of sound in biological tissue would have on the image reconstruction.

The salt phantom shows how the first order correction algorithm (changes in velocity along a straight line (unrefracted) path rather than an assumed constant speed of throughout the object) performs. The second order correction (refraction correction), as described above, works best when the variations in the speed of sound occur as a smooth function of space. The actual salt phantom velocity profile shows velocity changes only at the discontinuity at the cylinder wall and therefore is not a good test for the second order speed of sound correction.

Figure 9:
FIG. 9 is a positive of a "Acuson" scanner image.

A positive of a commercial scan of the actual phantom is shown in FIG. 9. This image is an enlarged positive from the B-scan negative from a commercial scanner using a 128 element 3 MHz linear array. The images from the commercial scanner are normally presented in the form of X-ray like negatives. To make a fair comparison between this type of scanner and the images from the improved synthetic focusing reconstructions, a positive was made from the negatives. The positives were enlarged by the usual photographic techniques by professional photographers. This image would appear to be of even poorer quality than shown in FIG. 9 if it were enlarged to a comparable size with the synthetic focusing reconstructions. This is because the lack of resolution would be even more apparent.

Figure 10:
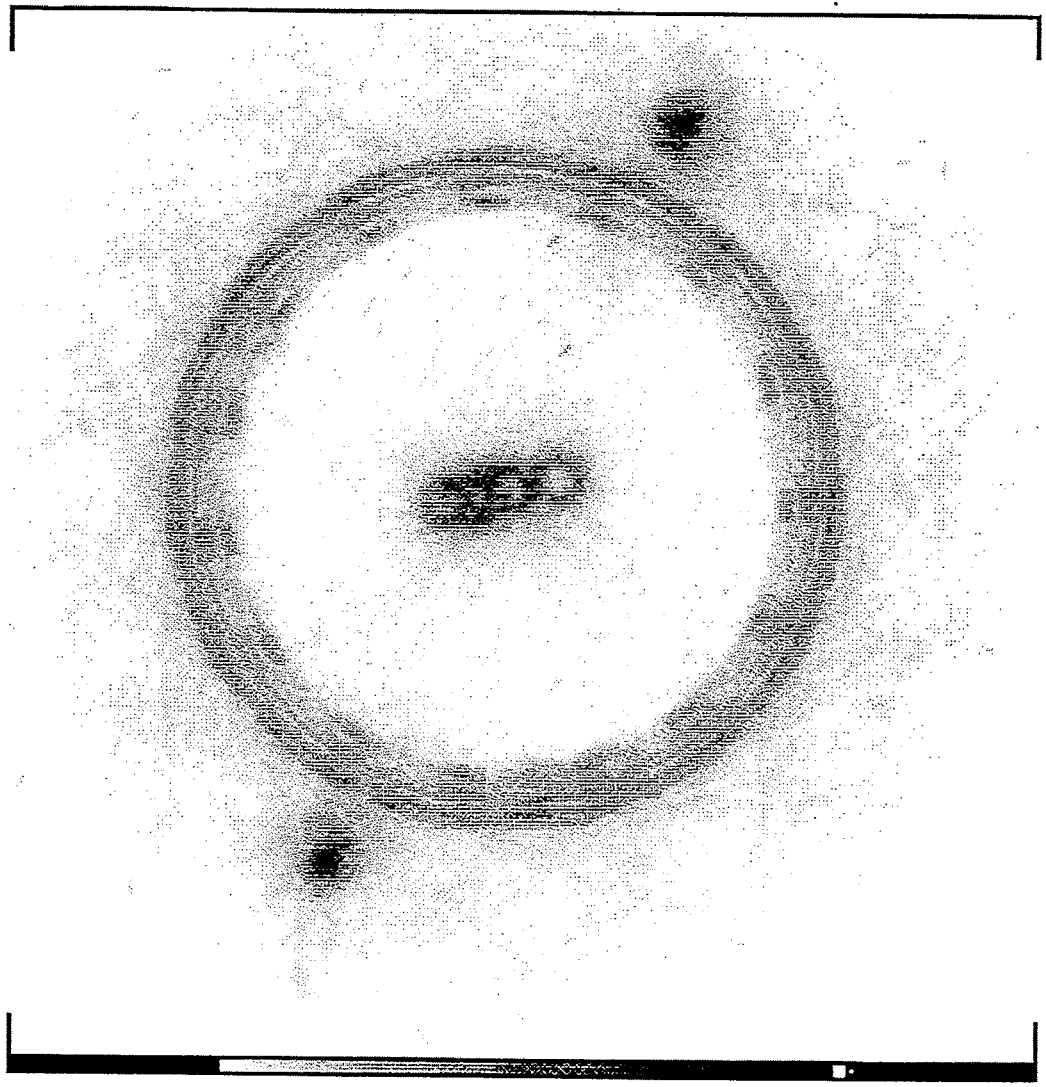
FIG. 10 is a representation of a grayscale image of the salt phantom reconstruction with no improvements to the synthetic focusing algorithm.
Figure 11:
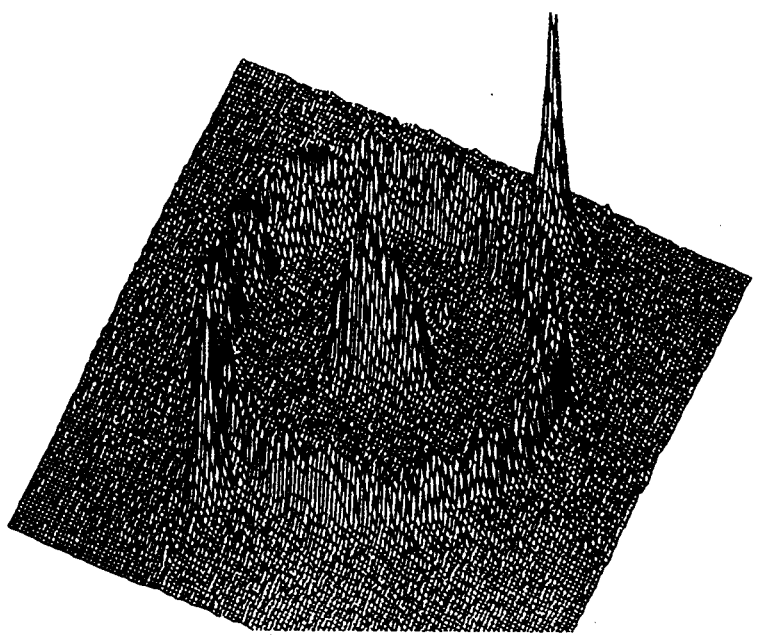
FIG. 11 is a contour representation of the uncorrected reconstruction of FIG. 10.
Figure 12:
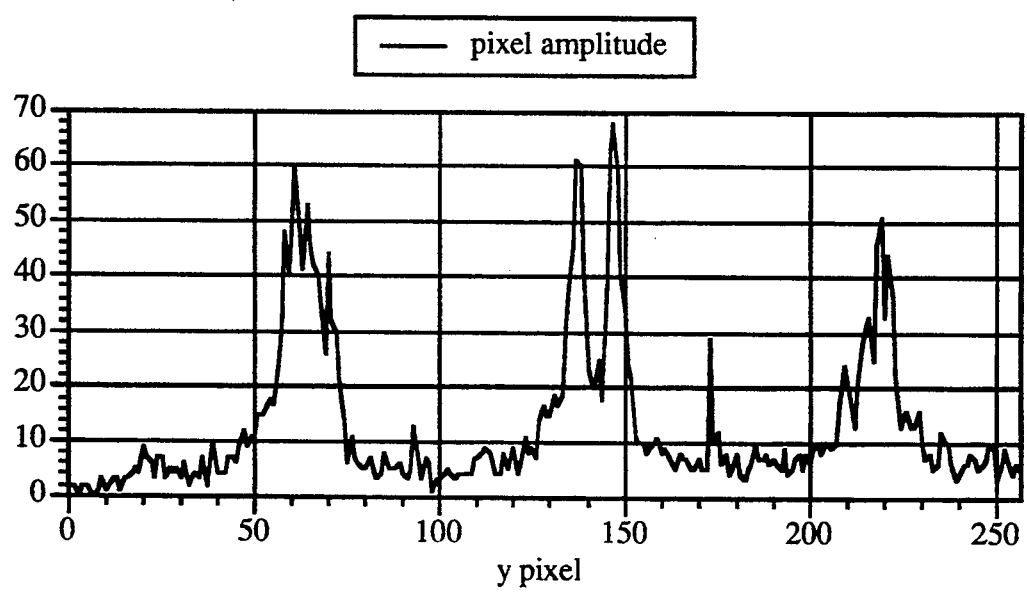
FIG. 12 is a one-dimensional plot of the vertical cross-sectional cut of the reconstruction of FIG. 10 through a thread in the center of the cylinder at pixel $x=138$.
Figure 13:
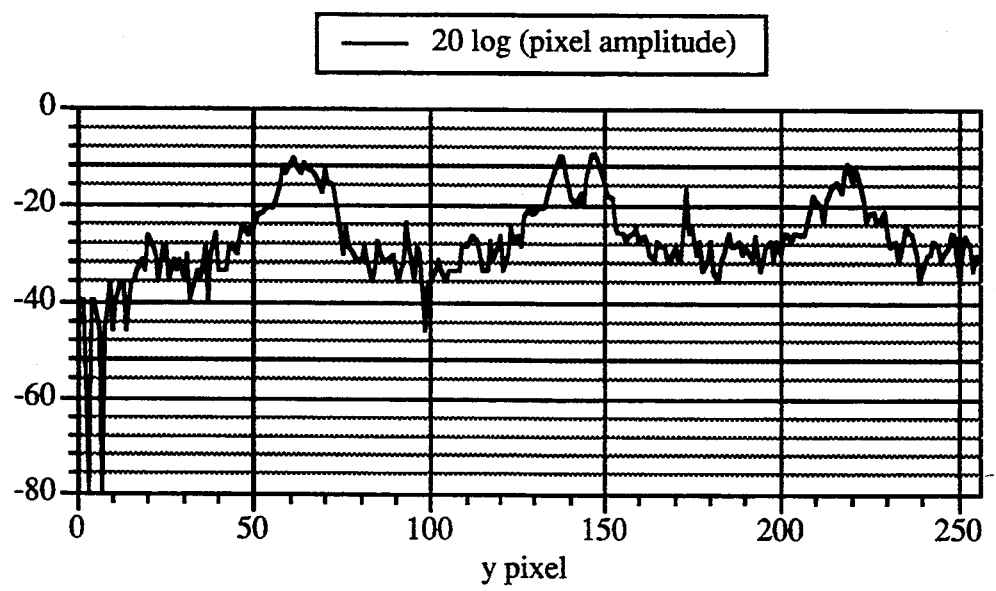
FIG. 13 is a one-dimensional 20 log 10 plot corresponding to FIG. 12.

FIG. 10 shows the grayscale plot of a reconstruction of the salt phantom. The contour plot of this image is seen in FIG. 11. Notice that the center threads trace out circles in FIG. 10 due the wrong estimate of the speed of sound within the cylinder. A one-dimensional plot along a cut of the image through the center of the cylinder at x=138 is seen in FIG. 12 and a decibel plot of this cut can be seen in FIG. 13. The width of the center thread, which appears as two peaks in the center, is 16 pixels at half maximum (maximum of the peak amplitude level of the thread). This exaggerated thread width and separation in the center thread is due to the changes in velocity of sound within the cylinder. The first sidelobe can be seen to be at about 20 dB down and the noise levels are at about 26 dB down. Raw signal noise analysis of the reflection data show the noise levels at 35 dB down. The cylinder walls appear thickened as well also because the speed of sound inaccuracies. The wall width is 15 pixels at half max (maximum of the peak amplitude level of the bottom wall). The threads on the outside of the object appear almost as the threads of the calibration phantom appear. This is due to the positioning of the outside threads, the reflections from the outside threads return to the detector without propagating through the central cylinder for most views. Because these reflection rays never enter the cylinder. The estimate of the speed of sound is realistic along those ray paths.

Figure 14:
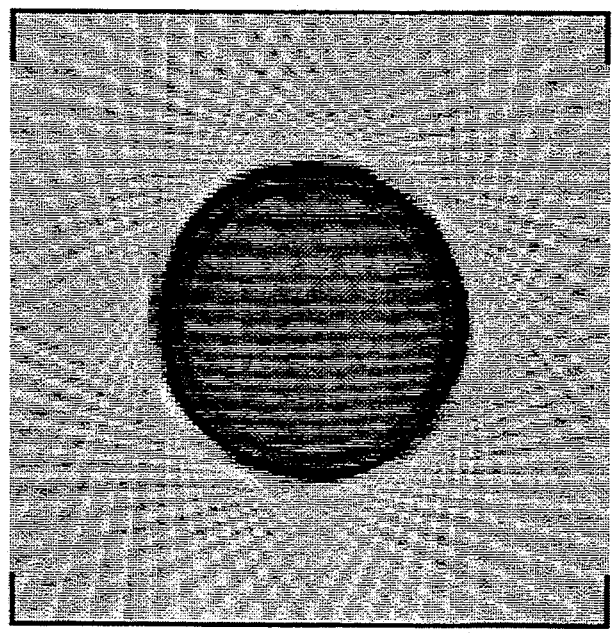
FIG. 14 is a grayscale image of a speed of sound reconstruction of the salt phantom.
Figure 16:
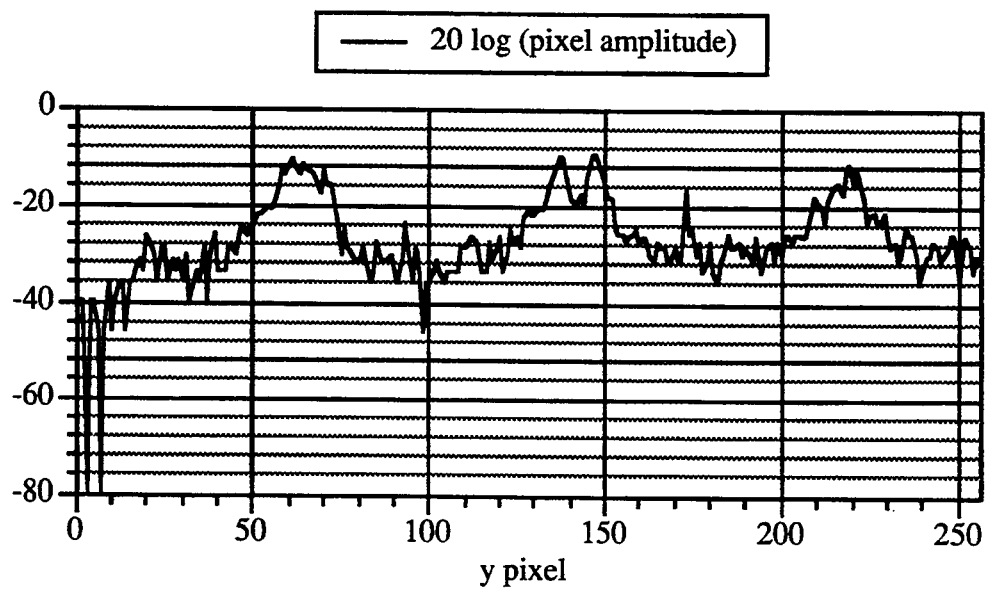
FIG. 16 is a contour representation of the straight ray path corrected reconstruction of FIG. 15.
Figure 17:
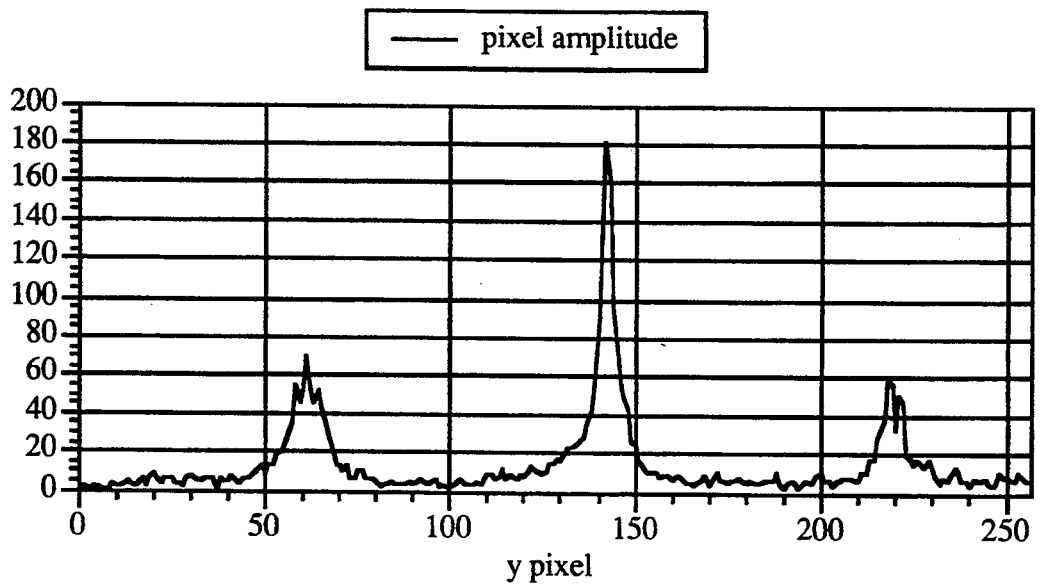
FIG. 17 is a one-dimensional plot of the vertical cross-sectional cut of the reconstruction of the salt phantom of FIG. 15 through a thread in the center of the cylinder at pixel=138.
Figure 18:
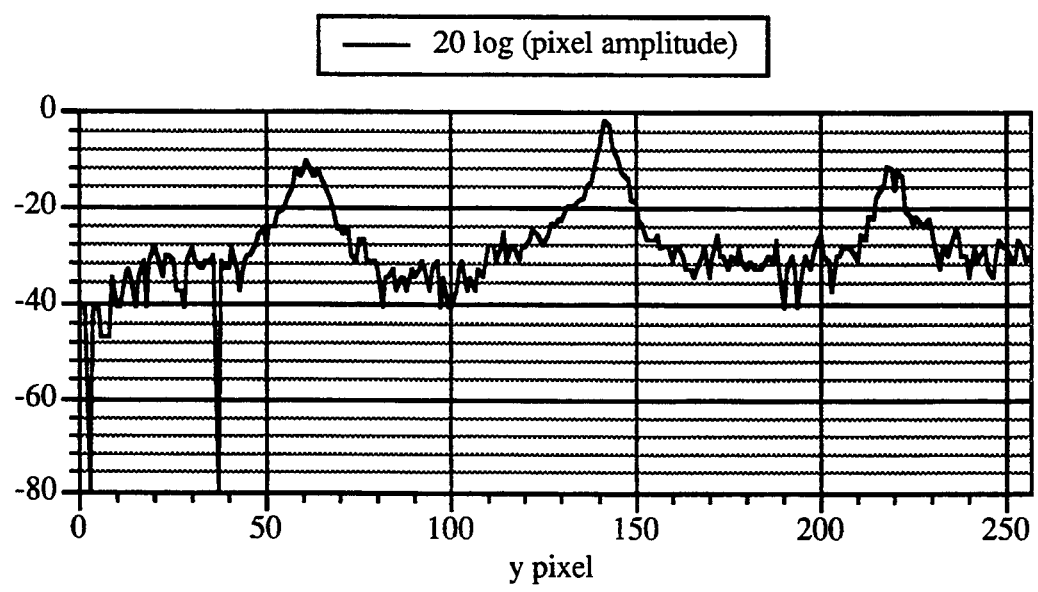
FIG. 18 is a one-dimensional 20 log 10 plot corresponding to FIG. 17.

A velocity profile image was reconstructed of the salt phantom from time of flight data. The grayscale plot of this image is presented in FIG. 14. This grayscale represents a 128 pixel by 128 pixel reconstruction. The darkest pixel represents the fastest speed of sound of $1.74 \times 10^6$ mm/sec and the lightest pixel represents the slowest speed of sound of $1.45 \times 10^6$ mm/sec. The total size of this reconstruction is 60 mm by 60 mm. The effects of the first order corrections using the information from FIG. 14 in the salt phantom reconstruction are in FIG. 15 which shows the usual 40 mm by 40 mm grayscale representation of the reconstruction corrected for the speed of sound variations along a straight line path. No other correction method has been used in this reconstruction. The contour plot of this image is seen in FIG. 16. A one-dimensional plot along a cut of the image through the center of the cylinder at x=138 is seen in FIG. 17 and a decibel plot of this image is seen in FIG. 18.

Figure 15:
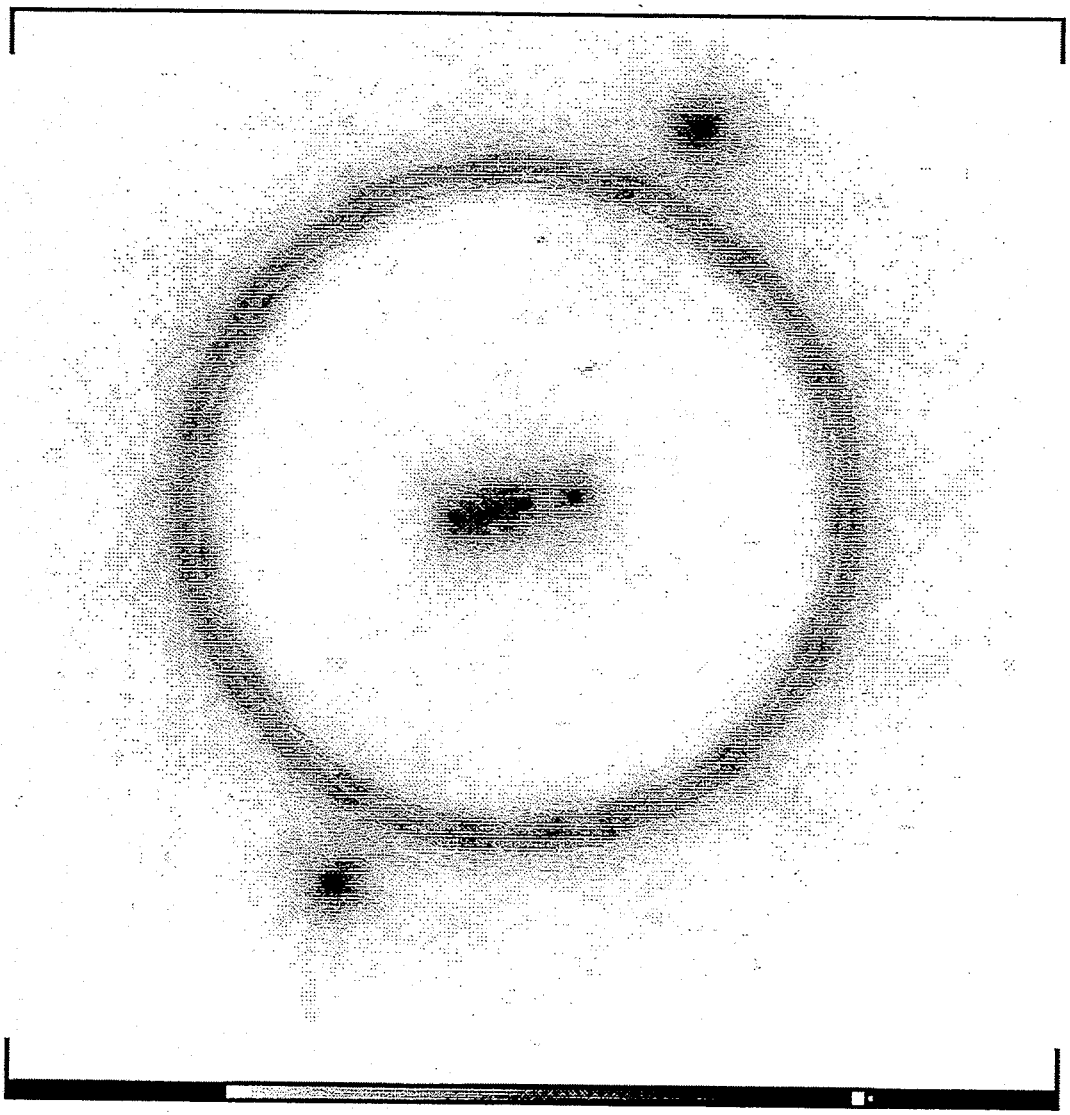
FIG. 15 is a grayscale image comparable to FIG. 10 showing the improvement to the internal thread shapes realized by applying straight ray path corrections to the synthetic focusing reconstruction algorithm.

A qualitative look at FIG. 15 compared to the uncorrected representation of FIG. 10 shows that the threads have become blurred points rather than circles and the wall of the cylinder has been thinned out by about half. Comparing FIG. 16 with the FIG. 11, it is seen that the right most center thread is seen as an individual thread and the four closely spaced threads are starting to show some separate identity rather than one massive blur. The wall thickness is seen as a thinner walled cylinder rather than the thicker walled cylinder of FIG. 11. FIG. 17 shows the center thread thickness at half maximum to be 5 pixels rather than the 16 pixel thickness of FIG. 12. Note also that the actual maximum pixel amplitude of the center thread is 182 rather than 68 as seen in FIG. 12. This is because the single views reflect a better estimate of where the thread reflections come from spatially and will constructively add during the summation step. The wall thickness is 10 pixels in width rather than the 15 pixel thickness of FIG. 12. The decibel plot of FIG. 18 shows that the sidelobes appear about 20 dB down and the noise levels are at about 28 dB down which is not much of an improvement from FIG. 13.

This correction is extremely important when using the summation technique for creating images as in these synthetic focusing reconstructions. Without this correction, the pixels affected by the speed of sound errors will not be positioned properly in the single view images. Then the summation process operating on the single view images will not have proper alignment of the pixels. This will create blurry images as seen in FIG. 10. As seen in FIG. 15, the method of correction of the speed of sound has a dramatic effect on image clarity.

Figure 19:
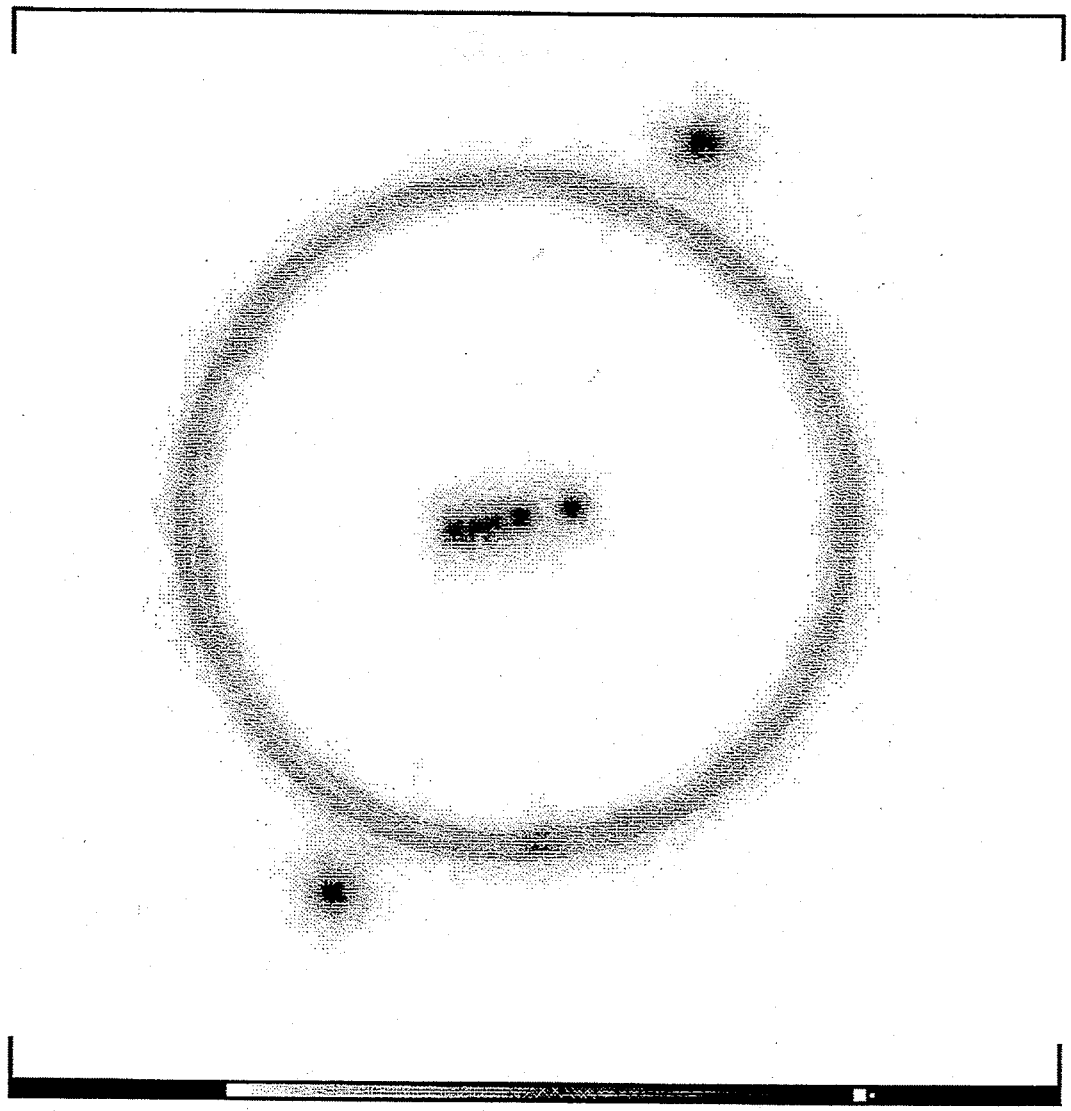
FIG. 19 is a grayscale image of the salt phantom reconstruction with speed of sound and adaptive focusing corrections to the synthetic focusing reconstruction algorithm.
Figure 20:
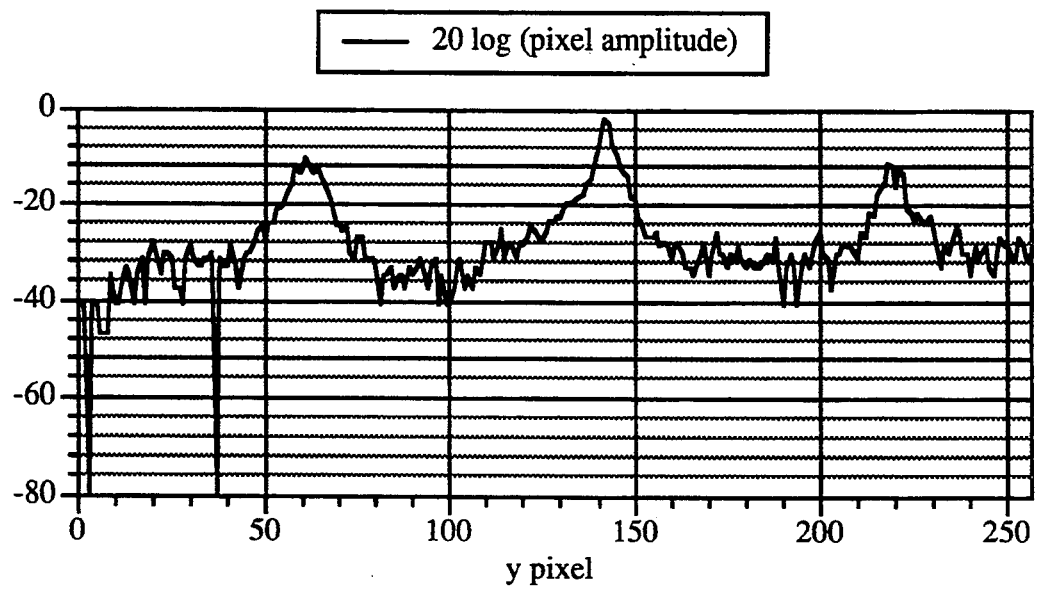
FIG. 20 is a contour representation of the corrected reconstruction of FIG. 19.
Figure 21:
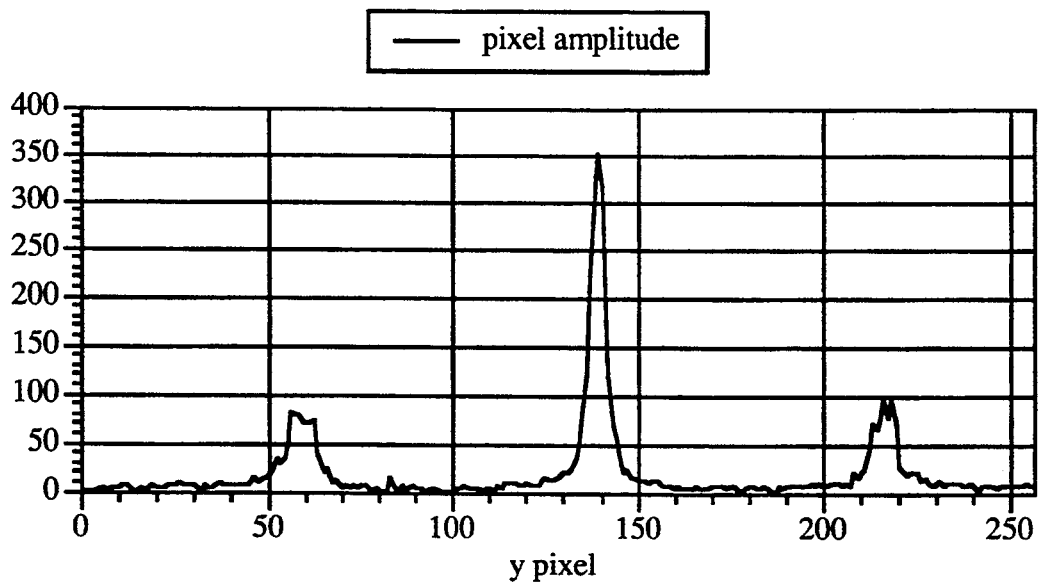
FIG. 21 is a one-dimensional plot of the vertical cross-sectional cut of the reconstruction of FIG. 19 through a thread at the center of the cylinder at pixel $x=138$.
Figure 22:
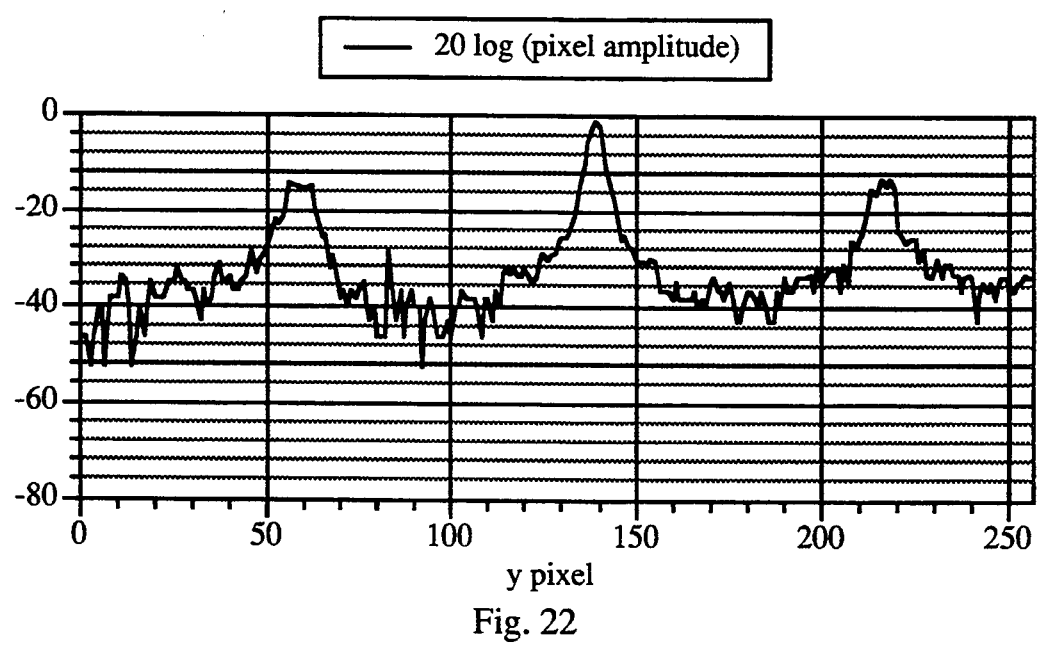
FIG. 22 is a one-dimensional 20 log 10 plot corresponding to FIG. 21.

The effects of the both adaptive focusing methods and the speed of sound corrections on the grayscale representation of the salt phantom image can be seen in FIG. 19. FIG. 20 shows the contour plot of this image. FIG. 21 shows the one-dimensional plot of the vertical (parallel to the y axis) profile cut at x=138 pixel and FIG. 22 shows the decibel plot of the FIG. 21. FIGS. 19, 20, 21, and 22 compare directly to FIGS. 10, 11, 12, and 13 respectively. These corrections show an improvement in peak signal levels by a factor of 5.19 when comparing peak signal levels (this includes the improvement due to speed of sound correction). This indicates significantly better alignment during the reconstruction. The contour plot shows the separation of the central thread unlike the uncorrected image. The central thread is 69% thinner (at half maximum levels) which shows considerable improvement. The walls are 56% thinner and 25 dB above the noise levels. Comparing FIG. 13 with FIG. 22 shows that the noise levels have again dropped from −30 dB to −40 dB.

Figure 23:
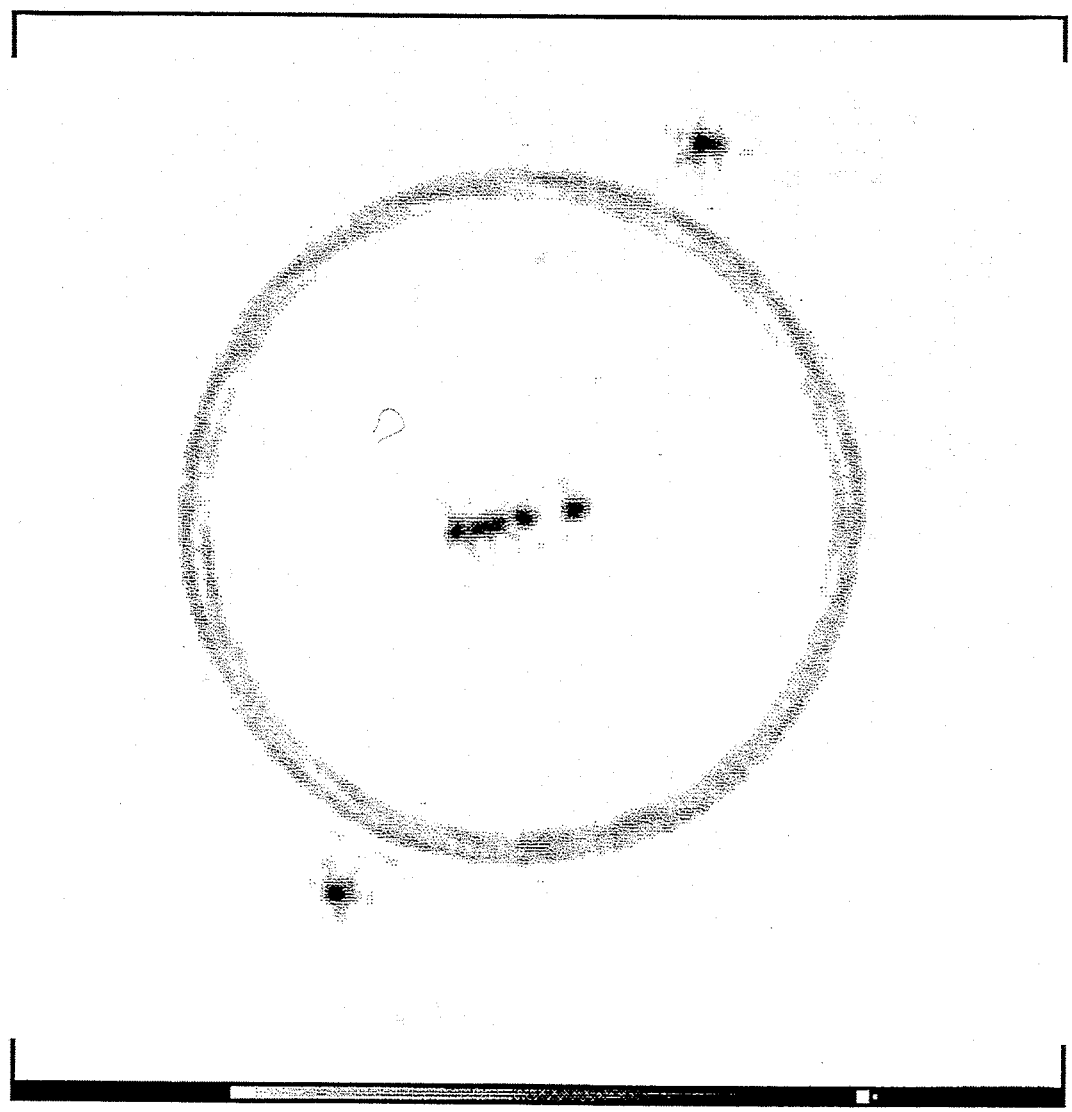
FIG. 23 is a grayscale image of the corrected salt phantom reconstruction of FIG. 19 after filtering by the inverse Wiener filter generated by a 4 pixel width model.
Figure 24:
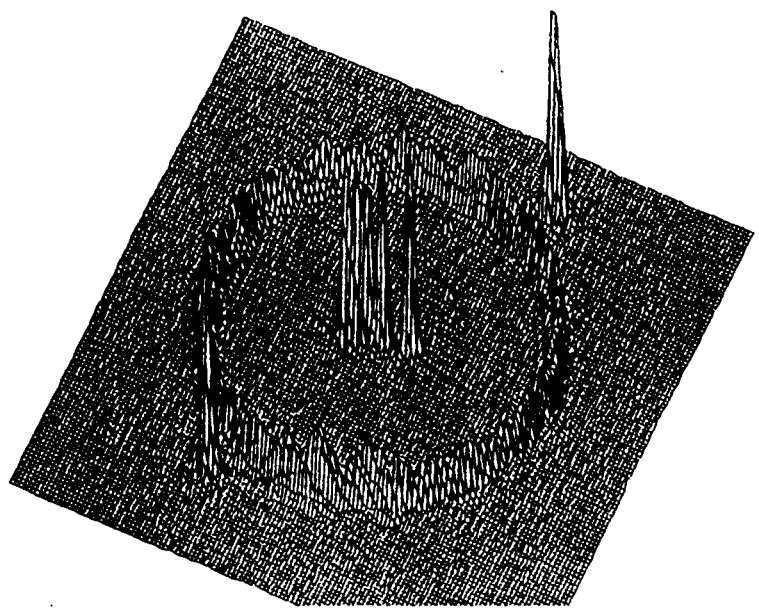
FIG. 24 is a contour representation of the filtered reconstruction of FIG. 23.
Figure 25:
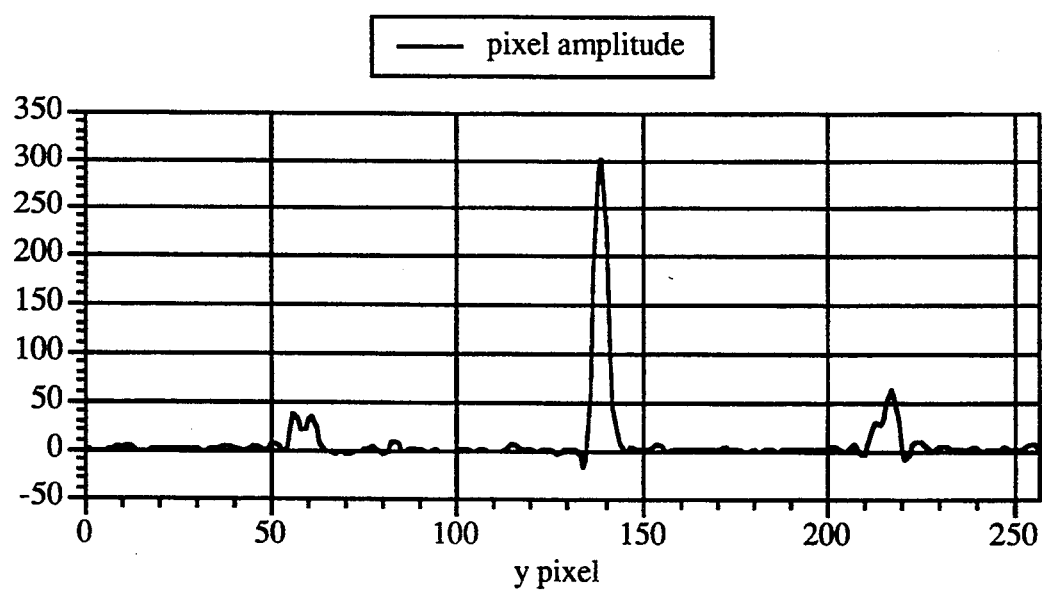
FIG. 25 is a one-dimensional plot of the vertical cross-sectional cut of the reconstruction of FIG. 23 through a thread at the center of the cylinder at pixel x=138.
Figure 26:
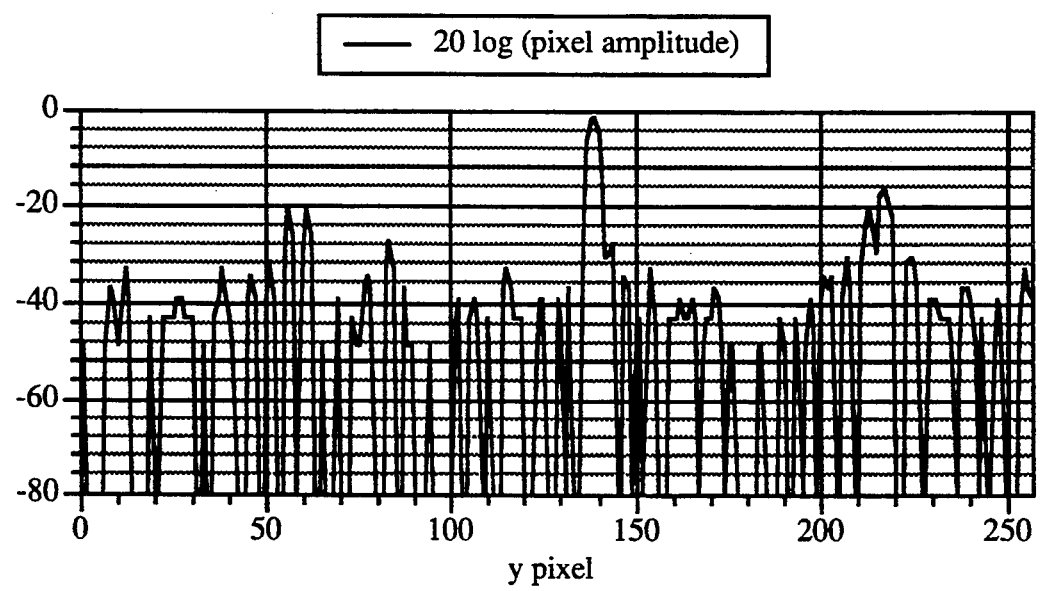
FIG. 26 is a one-dimensional 20 log 10 plot corresponding to FIG. 25.

The effects of this filter on the grayscale representation of the salt phantom image can be seen in FIG. 23 which compares directly to FIG. 10. It should be noticed that the ringing on the outside of the cylinder wall has been reduced. Note in FIG. 23, the walls of the cylinder appear thick but still distinct. FIG. 24 shows the contour plot of this image which compares to FIG. 11. FIG. 24 shows separation of the center threads, but is less distinct than in FIG. 11. This figure shows the reduced ringing noted in the previous thread image. FIG. 25 shows the one-dimensional plot of the vertical (parallel to the y axis) profile cut at the x=138 pixel and FIG. 26 shows the decibel plot of FIG. 25. FIGS. 25 and 26 compare directly to FIGS. 12 and 13.

The width of the center thread at half maximum level is slightly thicker (1 pixel width) as expected. It is seen in FIG. 26 that the walls are still about 25 dB above the noise levels. It also shows that the noise levels are at about −40 dB.

We claim:

1. In a reflection mode imaging system, an improved means of reconstructing reflectivity images from acoustic or ultrasonic waves, with the use of speed of sound velocity mapping from measured or estimated means, said improved means comprising: signal processing means constructed and arranged to use the calculus of variations to effect a correction of variations in propagation time along a path of propagation due to changes in the refractive index and variations in the speed of sound of an imaging target to estimate the error in a straight line path and to remove this error from a predicted time of propagation for said straight line path to calculate an actual time of propagation for an actual path propagation to predict times of arrivals of a reflected energy waveform.

2. The improvement in claim 1 wherein said signal processing means is comprised of a digital, computer oriented means.

3. The improvement in claim 1 wherein said signal processing means is comprised of an analog circuit oriented means.

4. In a reflection mode imaging system utilizing a phased array system, an improved means of reconstructing reflectivity images from acoustic or ultrasonic waves, with the use of signal processing means for correction of inaccurate estimates of the transducer array elements by use of an adaptive minimization technique to reduce an objective functional based on cross-correlation techniques to estimate the misalignment of reflected signals from a given calibration target.

5. The improvement in claim 4 wherein said signal processing means is comprised of a digital, computer oriented means.

6. The improvement in claim 4 wherein said signal processing means is comprised of an analog circuit oriented means.

7. In a reflection mode imaging system utilizing a phased array system or non-phase array transducer system using multiple views in the reconstruction signal processing, an improved means of reconstructing reflectivity images from acoustic or ultrasonic waves, with the use of signal processing means for correction of inaccurate estimates of the relative center of rotation of the various views by use of an adaptive minimization technique to reduce an objective functional based on cross-correlation techniques to estimate the misalignment of the individual views of the image reconstruction.

8. The improvement in claim 7 wherein said signal processing means is comprised of a digital, computer oriented means.

9. The improvement in claim 7 wherein said signal processing means is comprised of an analog circuit oriented means.

10. In a reflection mode imaging system utilizing a phased array system or non-phase array transducer system using multiple views in the reconstruction signal processing, an improved means of reconstructing reflectivity images from acoustic or ultrasonic waves, with the use of signal processing means for correction of inaccurate estimates of the relative angle of rotation of the various views by use of an adaptive minimization technique to reduce an objective functional based on cross-correlation techniques to estimate the misalignment of the individual views of the image reconstruction.

11. The improvement in claim 10 wherein said signal processing means is comprised of a digital, computer oriented means.

12. The improvement in claim 10 wherein said signal processing means is comprised of an analog circuit oriented means.

13. In a reflection mode imaging system utilizing a phased array system or non-phase array transducer system using multiple views in the reconstruction signal processing, an improved means of reconstructing reflectivity images from acoustic or ultrasonic waves, with the use of signal processing means for correction of the point spread function or blurring function of the imaging system by use of a calibration imaging target to perform an estimate of the point spread or blurring function so that said function may be removed from the reconstruction by additional signal processing means.

14. The improvement in claim 13 wherein said signal processing means is comprised of a digital, computer oriented means.

15. The improvement in claim 13 wherein said signal processing means is comprised of an analog circuit oriented means.

16. In an acoustic imaging system comprising source transducers and detector transducers positioned with respect to an imaging target having a volume, said transducers operating to transmit acoustic energy in the direction of the target and to receive reflected energy signals emanating from said target, and further comprising means for processing said signals to generate a reflectivity image representative of the structure of said target, the improvement which comprises:
   a) dividing the volume of said target into volume elements of smaller size;
   b) estimating the average speed of sound throughout each said volume element;
   c) calculating the time of propagation along the straight line path from a plurality of said source transducers to a plurality of reflection points to a plurality of detector transducers, based upon the estimates of step b);
   d) calculating the refractive index with respect to a reference speed of sound for each said volume element;
   e) calculating the error in the time of propagation calculation of step c), said error being calculated from the normal derivatives of the respective refractive indices of step d) along the straight line paths from said source transducers to reflection points to detector transducers as indicated by the calculus of variations;
   f) calculating an improved estimate of the time of propagation of step c) by removing the error in the estimate which was calculated in step e); and
   g) generating an improved reflectivity image from the improved estimate of the time of propagation calculated in step f).

17. The improvement according to claim 16 wherein the refractive index of each volume element is the functional equivalent of a ratio of a reference speed of sound and the speed of sound of each said volume element.

18. The improvement of claim 16 wherein said detector transducers are structured and arranged to detect transmission signals.

19. The improvement of claim 16 wherein said reflected signals include refracted signals.

20. In an acoustic imaging system comprising an array of source transducers and detector transducers positioned with respect to an imaging target said array operating to transmit acoustic energy in the direction of the target and to receive reflected energy signals emanating from said target, and further comprising means for processing said signals to generate a reflectivity image representative of the structure of said target, the improvement which comprises:
   a) estimating the positions of said source and detector transducers;
   b) collecting through said detector transducers a set of spatial representations of reflection signals from a known imaging calibration target, each said representation corresponding to a reflection signal from a said source transducer to a said detector transducer;
   c) forming a phased array error function based on cross-correlation techniques to estimate a misregistration of the set of spatially represented reflected signals collected in step b);
   d) correcting the misregistration to find improved estimates of the respective positions of said transducers within said array by shifting said set of spatially represented reflected signals collected in step b) to minimize the phase array error function formed by step c); and
   e) generating an improved reflectivity image from the improved estimates found by step d).

21. The improvement of claim 20 wherein said detector transducers are structured and arranged to detect transmission signals.

22. The improvement of claim 20 wherein said reflected signals include refracted signals.

23. In an acoustic imaging system comprising source transducers and detector transducers positioned with respect to an imaging target having a volume, said transducers operating to transmit acoustic energy in the direction of the target and to receive reflected energy signals emanating from said target, and further comprising means for processing said signals to generate a reflectivity image representative of the structure of said target, the improvement which comprises:
   a) estimating the positions of said source and detector transducers;
   b) collecting through said detector transducers a set of time-based representations of reflection signals from a known imaging calibration target, each said representation corresponding to a reflection signal from a said source transducer to a said detector transducer;
   c) forming a phased array error function based on cross-correlation techniques to estimate a misregistration of the set of time-based representations of the reflected signals collected in step b);
   d) correcting the misregistration of said time-based representations to find improved estimates of the respective positions of said transducers within said array by shifting said set of time-based representations of the reflected signals collected in step b) to minimize the phase array error function formed by step c); and
   e) generating an improved reflectivity image from the improved estimates found by step d).

24. The improvement of claim 23 wherein said detector transducers are structured and arranged to detect transmission signals.

25. In an acoustic imaging system comprising an array of source transducers and detector transducers positioned with respect to an imaging target said array operating to transmit acoustic energy in the direction of the target and to receive reflected energy signals emanating from said target, and further comprising means for processing said signals to generate a reflectivity image representative of the structure of said target, the improvement which comprises:
   a) using the imaging system to generate a set of reconstructions from different relative view positions of the imaging target;
   b) estimating the center of rotation about which each reconstruction of step a) is rotated with respect to another said reconstruction of step a);
   c) estimating the angle of rotation that each said reconstruction of step a) is rotated with respect to another said reconstruction of step a);
   d) choosing a first reconstruction of step a) corresponding to a first angle of observation;

e) performing a rotational transformation on a second reconstruction of step a) corresponding to a second angle of observation based on the estimated angle of rotation of step c) of said second reconstruction about the estimated center of rotation of step b) of said second reconstruction so that the second reconstruction may be better aligned with said first reconstruction;

f) forming a center of rotation error function based on cross-correlation techniques to estimate the misalignment of said second reconstruction with respect to said first reconstruction in terms of an error in the estimate of the center of rotation of step b) of said second reconstruction;

g) correcting the center of rotation estimate of step b) of said second reconstruction by shifting it to minimize the center of rotation error function of step f);

h) generating an improved rotationally transformed second reconstruction using the improved estimate of step g), whereby to achieve an improved alignment of said improved rotationally transformed second reconstruction with said first reconstruction of step d);

i) repeating steps d) through h) substituting a plurality of alternative reconstructions for said second reconstruction; and j) generating an improved reflectivity image from aligned reconstructions formed by combining said first reconstruction and said second and alternative reconstructions.

26. In an acoustic imaging system comprising an array of source transducers and detector transducers positioned with respect to an imaging target said array operating to transmit acoustic energy in the direction of the target and to receive reflected energy signals emanating from said target, and further comprising means for processing said signals to generate a reflectivity image representative of the structure of said target, the improvement which comprises:

a) using the imaging system to generate a set of reconstructions from different relative view positions of the imaging target;

b) estimating the center of rotation about which each reconstruction of step a) is rotated with respect to another said reconstruction of step a);

c) estimating the angle of rotation that each said reconstruction of step a) is rotated with respect to another said reconstruction of step a);

d) choosing a first reconstruction of step a) corresponding to a first angle of observation;

e) performing a rotational transformation on a second reconstruction of step a) corresponding to a second angle of observation based on the estimated angle of rotation of step c) of said second reconstruction about the estimated center of rotation of step b) of said second reconstruction so that the second reconstruction may be better aligned with said first reconstruction;

f) forming an angle of rotation error function based on cross-correlation techniques to estimate the misalignment of said second reconstruction with respect to said first reconstruction in terms of an error in the estimate of the angle of rotation of step c) of said second reconstruction;

g) correcting the angle of rotation estimate of step c) of said second reconstruction by shifting it to minimize the angle of rotation error function of step f);

h) generating an improved rotationally transformed second reconstruction using the improved estimate of step g), whereby to achieve an improved alignment of said improved rotationally transformed second reconstruction with said first reconstruction of step d);

i) repeating steps d) through h) substituting a plurality of alternative reconstructions for said second reconstruction; and j) generating an improved reflectivity image from aligned reconstructions formed by combining said first reconstruction and said second and alternative reconstructions.

27. In an acoustic imaging system comprising an array of source transducers and detector transducers positioned with respect to an imaging target said array operating to transmit acoustic energy in the direction of the target and to receive reflected energy signals emanating from said target, and further comprising means for processing said signals to generate a reflectivity image representative of the structure of said target, the improvement which comprises:

a) using the imaging system to generate a set of reconstructions from different relative view positions of the imaging target;

b) estimating the center of rotation about which each reconstruction of step a) is rotated with respect to another said reconstruction of step a);

c) estimating the angle of rotation that each said reconstruction of step a) is rotated with respect to another said reconstruction of step a);

d) choosing a first reconstruction of step a) corresponding to a first angle of observation;

e) performing a rotational transformation on a second reconstruction of step a) corresponding to a second angle of observation based on the estimated angle of rotation of step c) of said second reconstruction about the estimated center of rotation of step b) of said second reconstruction so that the second reconstruction may be better aligned with said first reconstruction;

f) forming an angle of rotation error function based on cross-correlation techniques to estimate the misalignment of said second reconstruction with respect to said first reconstruction in terms of an error in the estimate of the angle of rotation of step c) of said second reconstruction;

g) forming a center of rotation error function based on cross-correlation techniques to estimate the misalignment of said second reconstruction with respect to said first reconstruction in terms of an error in the estimate of the center of rotation of step b) of said second reconstruction;

h) forming a combined error function from the functions formed in steps f) and g);

i) correcting the center of rotation estimate of step b) of said second reconstruction by shifting it to minimize the combined error function of step h);

j) generating an improved rotationally transformed second reconstruction using the improved estimate of step i), whereby to achieve an improved alignment of said improved rotationally transformed second reconstruction with said first reconstruction of step d);

k) correcting the angle of rotation estimate of step c) of said second reconstruction by shifting it to minimize the combined error function of step h);

l) generating an improved rotationally transformed second reconstruction using the improved estimates of steps i and k), whereby to achieve an improved alignment of said improved rotationally transformed second reconstruction with said first reconstruction of step d);

m) optionally repeating steps i through l further to reduce the combined error function;

n) repeating steps d) through m) substituting a plurality of alternative reconstructions for said second reconstruction; and o) generating an improved reflectivity image from aligned reconstructions formed by combining said first reconstruction and said second and alternative reconstructions.

28. In an acoustic imaging system comprising an array of source transducers and detector transducers positioned with respect to an imaging target said array operating to transmit acoustic energy in the direction of the target and to receive reflected energy signals emanating from said target, and further comprising means for processing said signals to generate a reflectivity image representative of the structure of said target, the improvement which comprises:

a) making multiple estimates of the point spread function of the imaging system from a known calibration target;

b) combining the multiple estimates of step a) to generate an improved estimate of the point spread function;

c) calculating an inverse filter from the improved estimate of the point spread function of step b); and d) performing filtering operations on images generated from said imaging system using the inverse filter calculated in step c).

29. The improvement of claim 28 wherein the multiple estimates of step b) are combined by arithmetic averaging to generate said improved estimate of the point spread function.

* * * * *